United States Patent [19]

Benuzzi, deceased et al.

[11] Patent Number: 4,986,726

[45] Date of Patent: Jan. 22, 1991

[54] PLANT FOR AUTOMATICALLY STACKING AND ORDERLY ARRANGING PACKS OF PANELS OF DIFFERENT SIZES

[76] Inventors: Gino Benuzzi, deceased, late of Bologna, Italy; by Piergiorgio Benuzzi, heir, 5, Via Angelo Custode, Bologna, Italy

[21] Appl. No.: 385,994

[22] Filed: Jul. 27, 1989

Related U.S. Application Data

[63] Continuation of Ser. No. 871,331, Jun. 6, 1986, abandoned.

[30] Foreign Application Priority Data

Jun. 7, 1985 [IT] Italy ................. 12518 A/85

[51] Int. Cl.⁵ .................. B65G 57/06; B65H 35/00
[52] U.S. Cl. .................. 414/789.1; 198/372; 198/740; 414/790; 414/792.6; 414/794; 414/799
[58] Field of Search ................. 198/370, 372, 457; 414/789.1, 790, 790.9, 791, 791.1, 791.6, 792.6, 794, 793.4, 799

[56] References Cited

U.S. PATENT DOCUMENTS

| | | | |
|---|---|---|---|
| 2,886,929 | 5/1959 | Villemont | 414/53 X |
| 3,938,674 | 2/1976 | Kroeze et al. | 414/51 X |
| 4,121,723 | 10/1978 | Nellen et al. | 414/53 X |
| 4,367,999 | 1/1983 | Benuzzi | 414/51 |
| 4,576,536 | 3/1986 | Benuzzi | 414/51 |

FOREIGN PATENT DOCUMENTS 2827978 1/1980 Fed. Rep. of Germany ........ 414/51

Primary Examiner—Robert J. Spar
Assistant Examiner—Janice Krizek
Attorney, Agent, or Firm—Pollock, Vande Sande & Priddy

[57] ABSTRACT

A plant for the automatic stacking and orderly arrangement of different sized panels. The plant causes the packs of panels coming from the dividing machine to reach a first transport runway, arranged either side by side or in end-to-end sequence depending upon their size and stacking requirements. Ranged on a line beside the runway are lifting platforms to which the packs are supplied and onto which are stacked packs of panels of the same size. The stacks are then transferred to stations adjacent the lifting platforms, where they are arranged in order either end to end or, if desired, side by side to form parallelepiped assemblies which are then transferred to a discharge station after being, optionally, arranged on a pallet or other support.

15 Claims, 21 Drawing Sheets

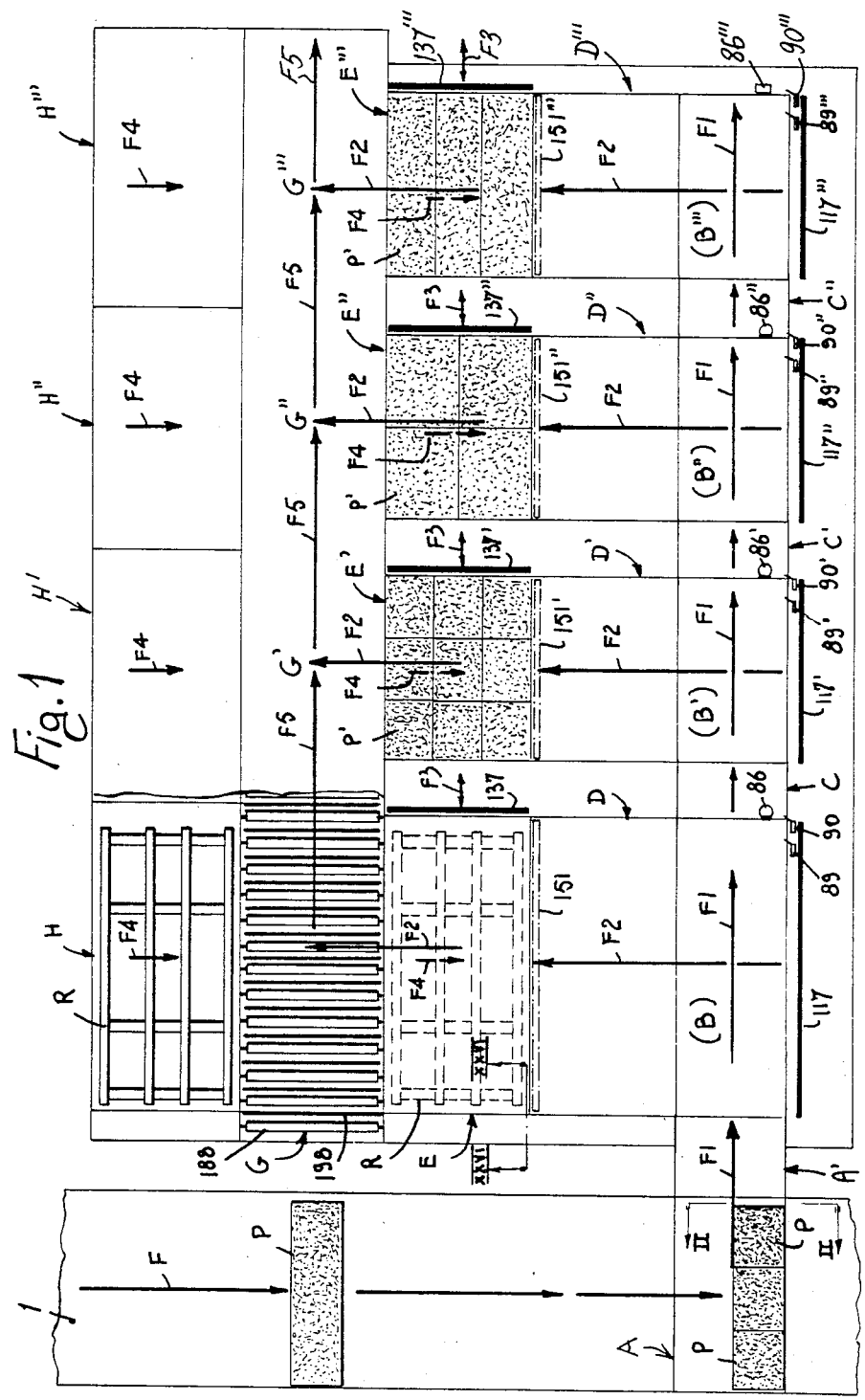

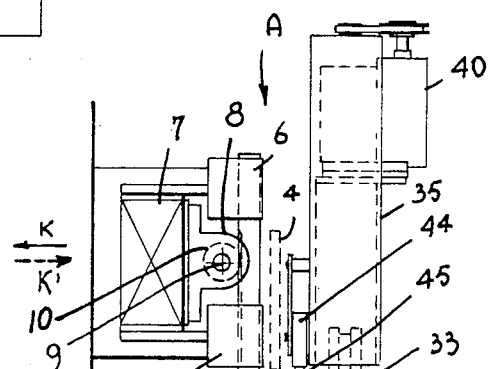
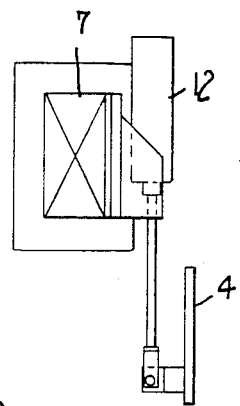
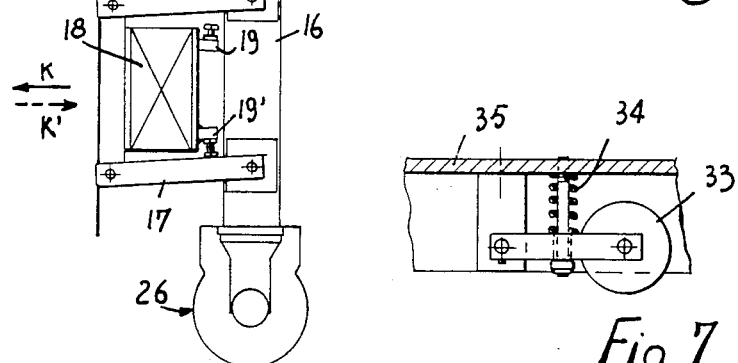
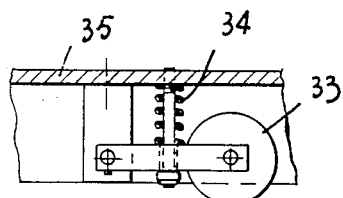

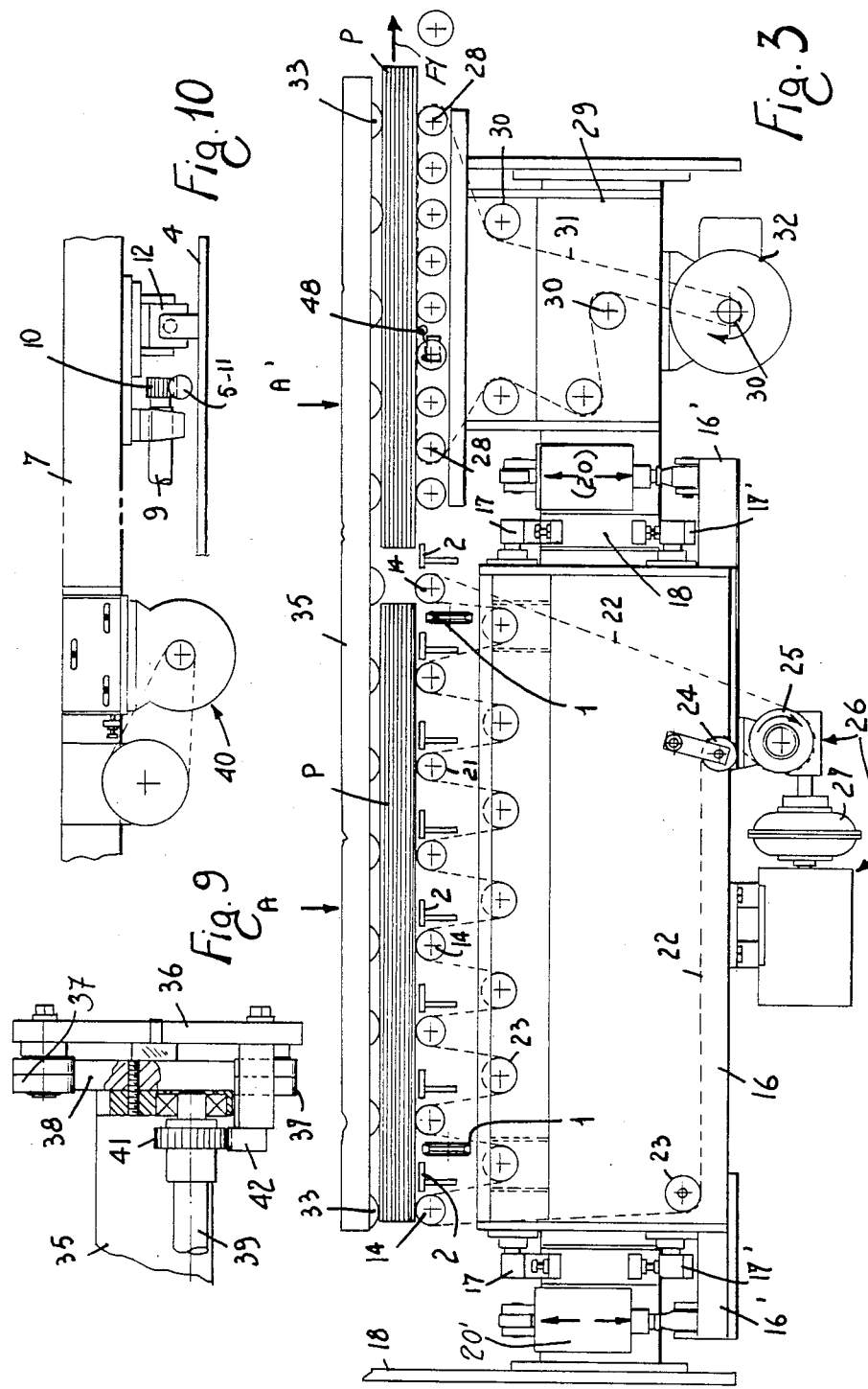

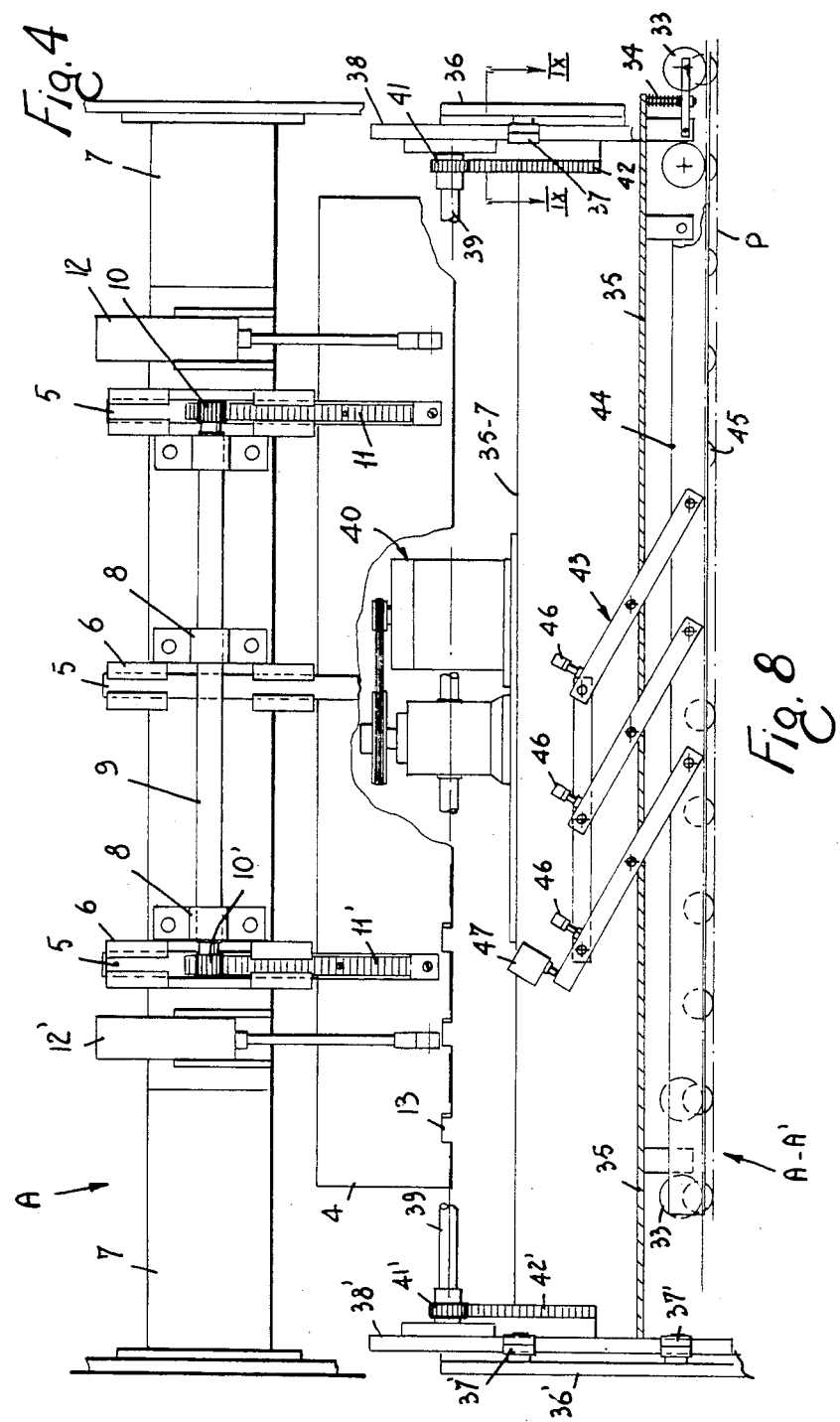

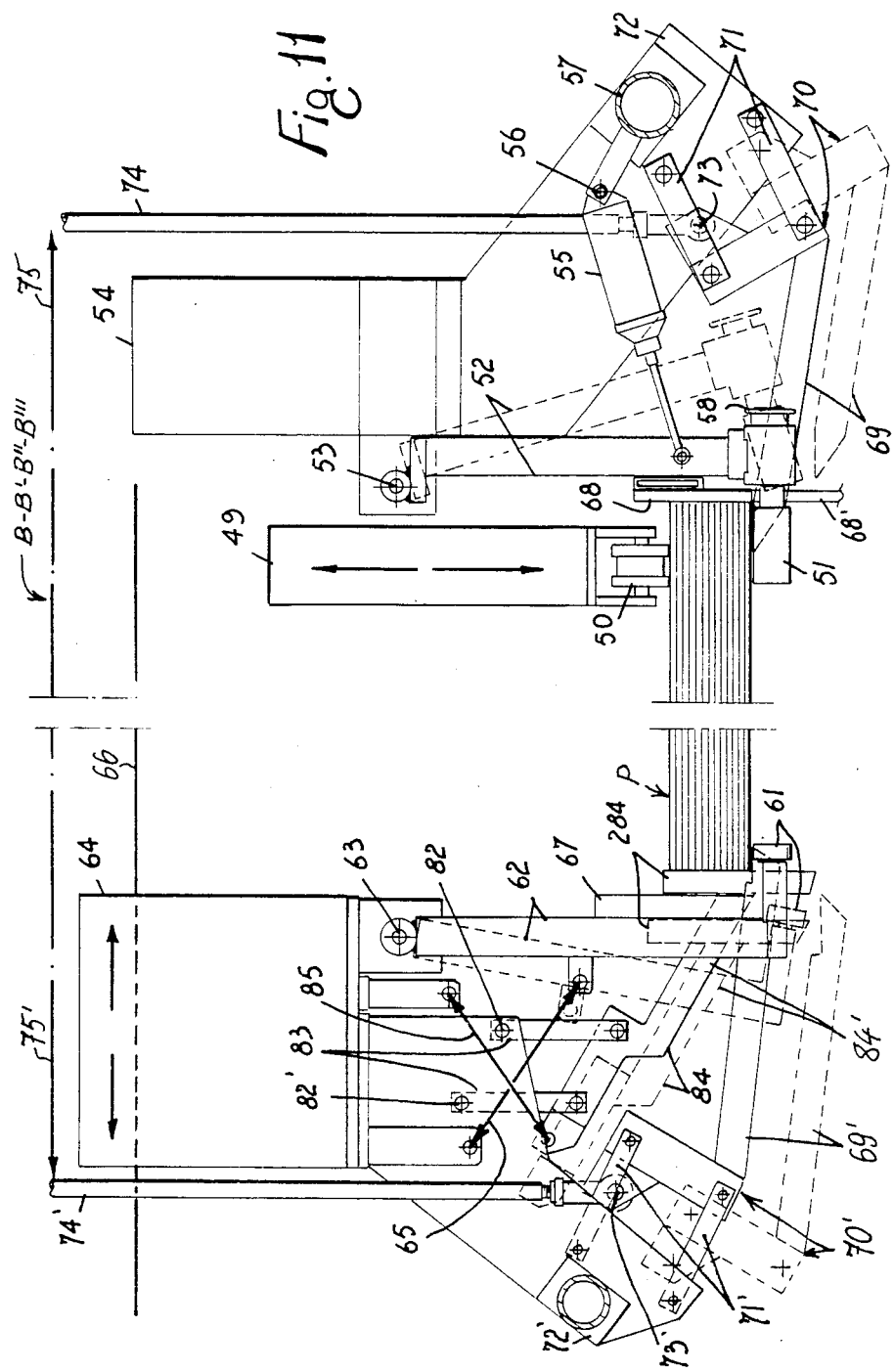

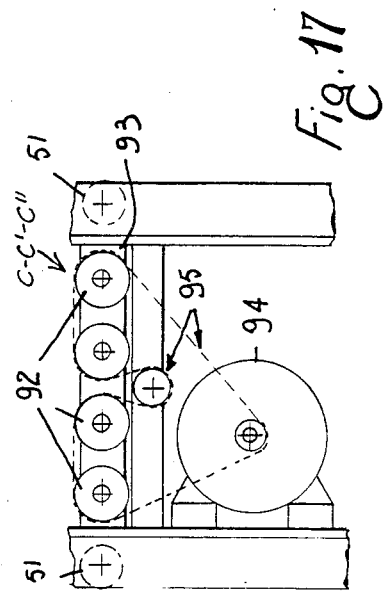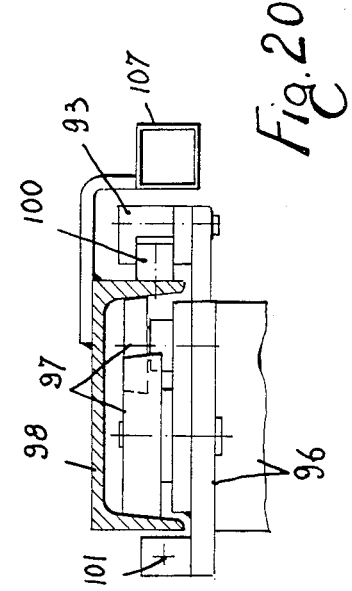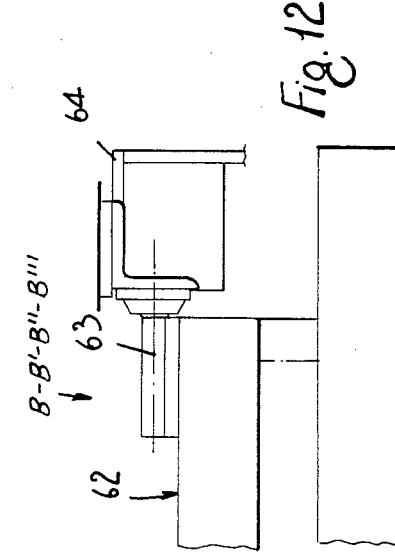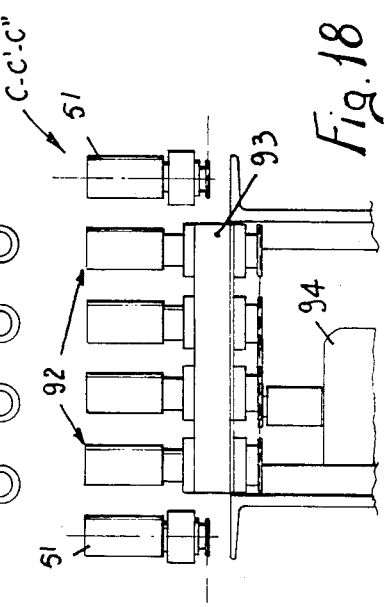

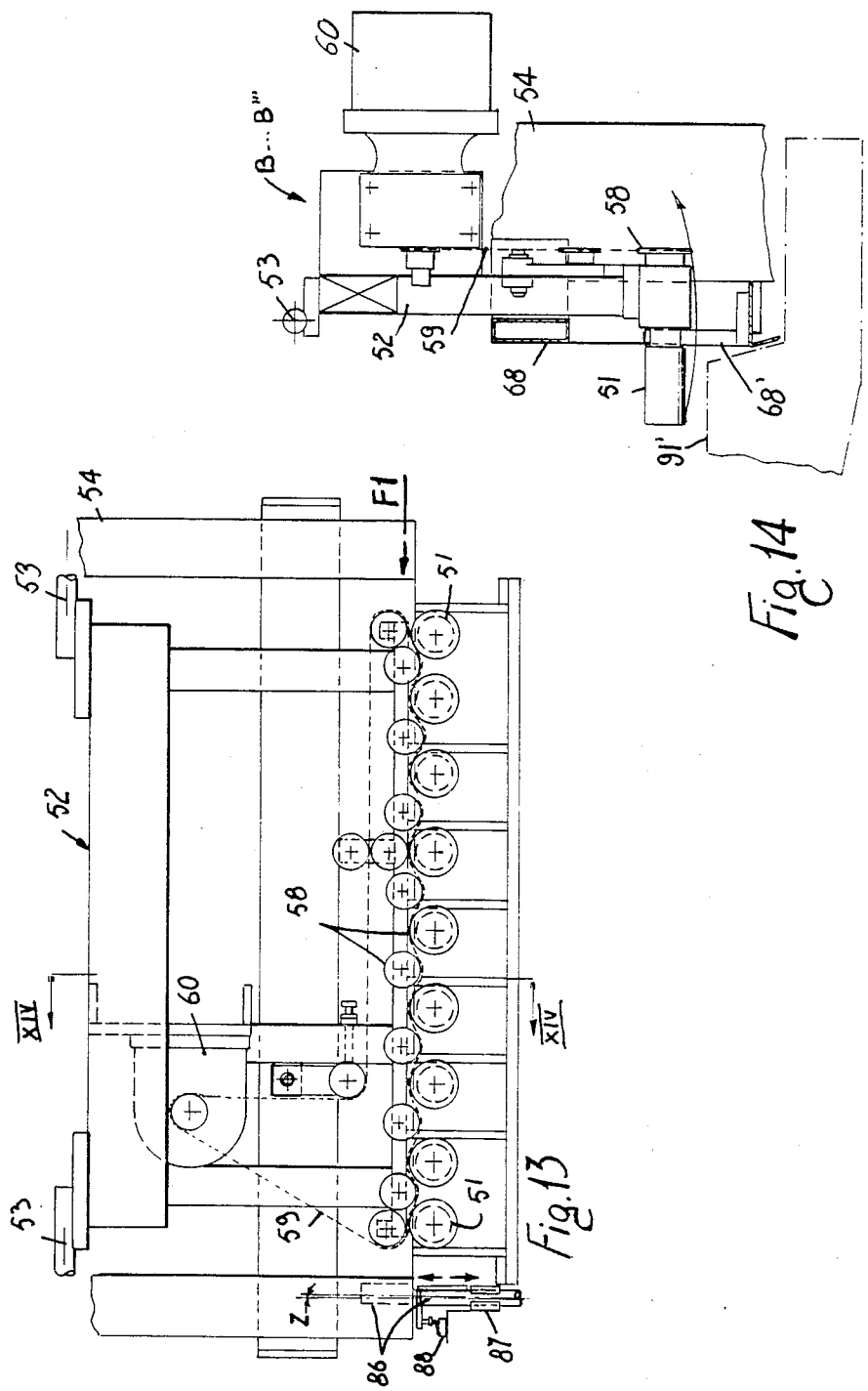

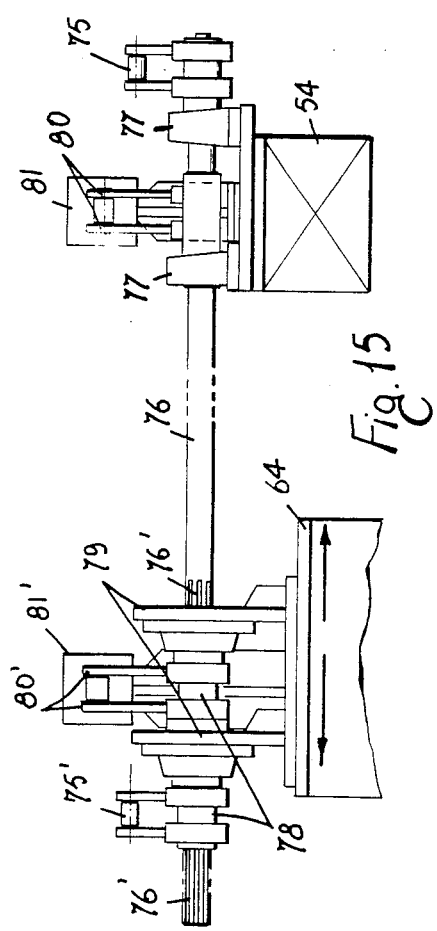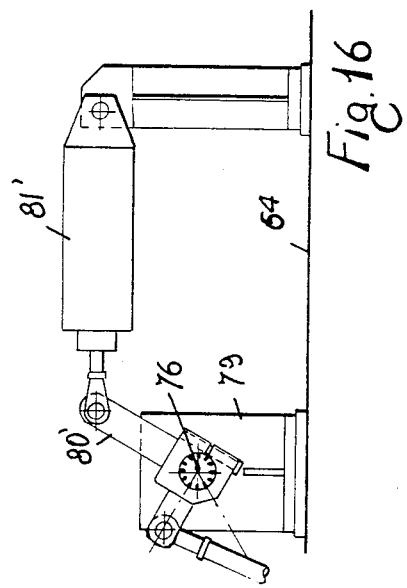

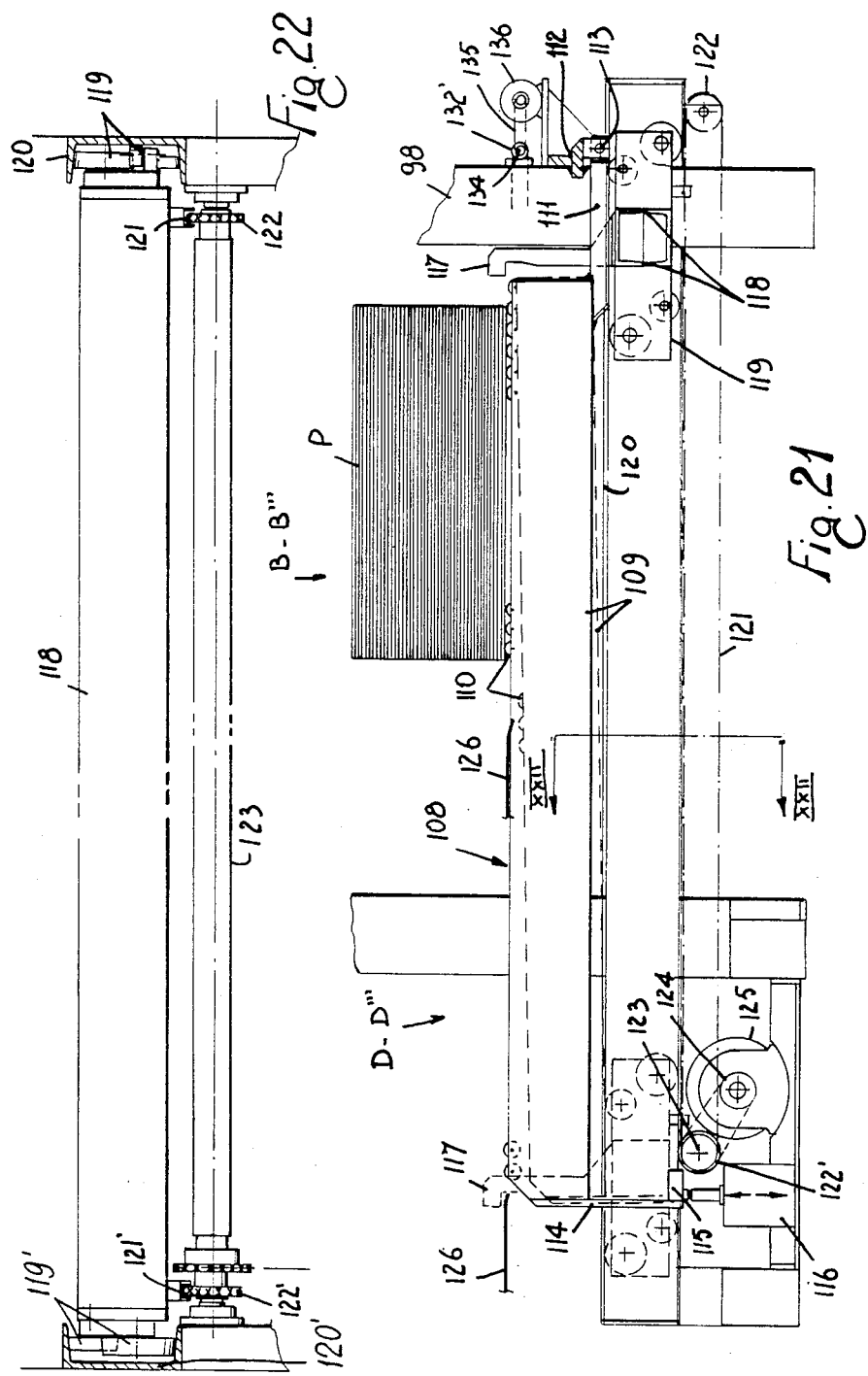

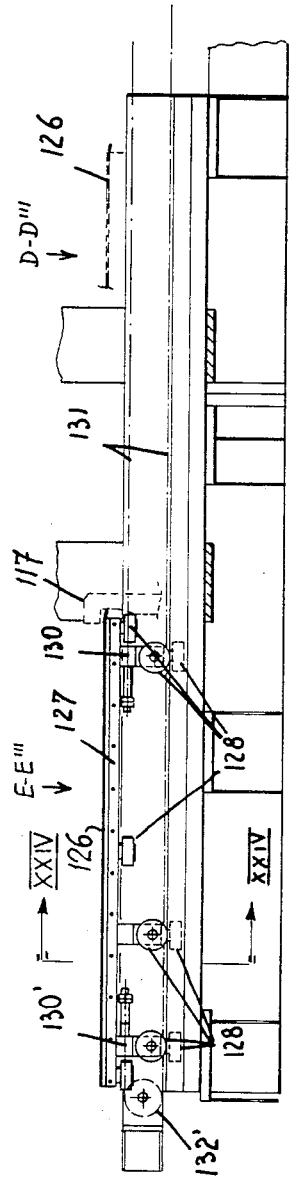
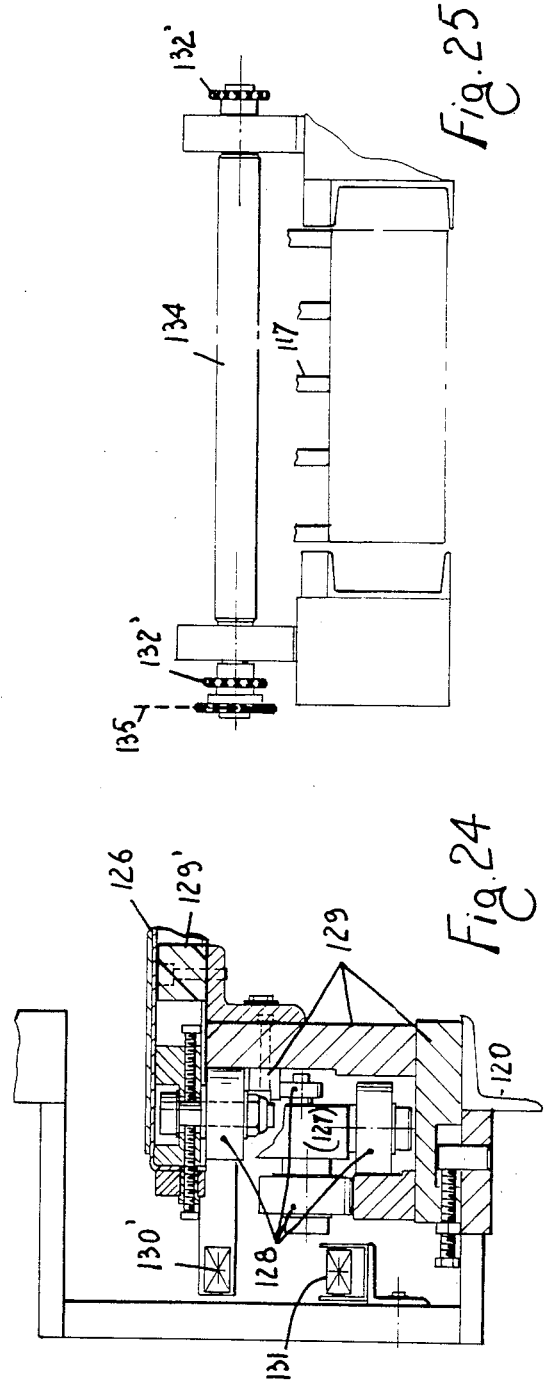

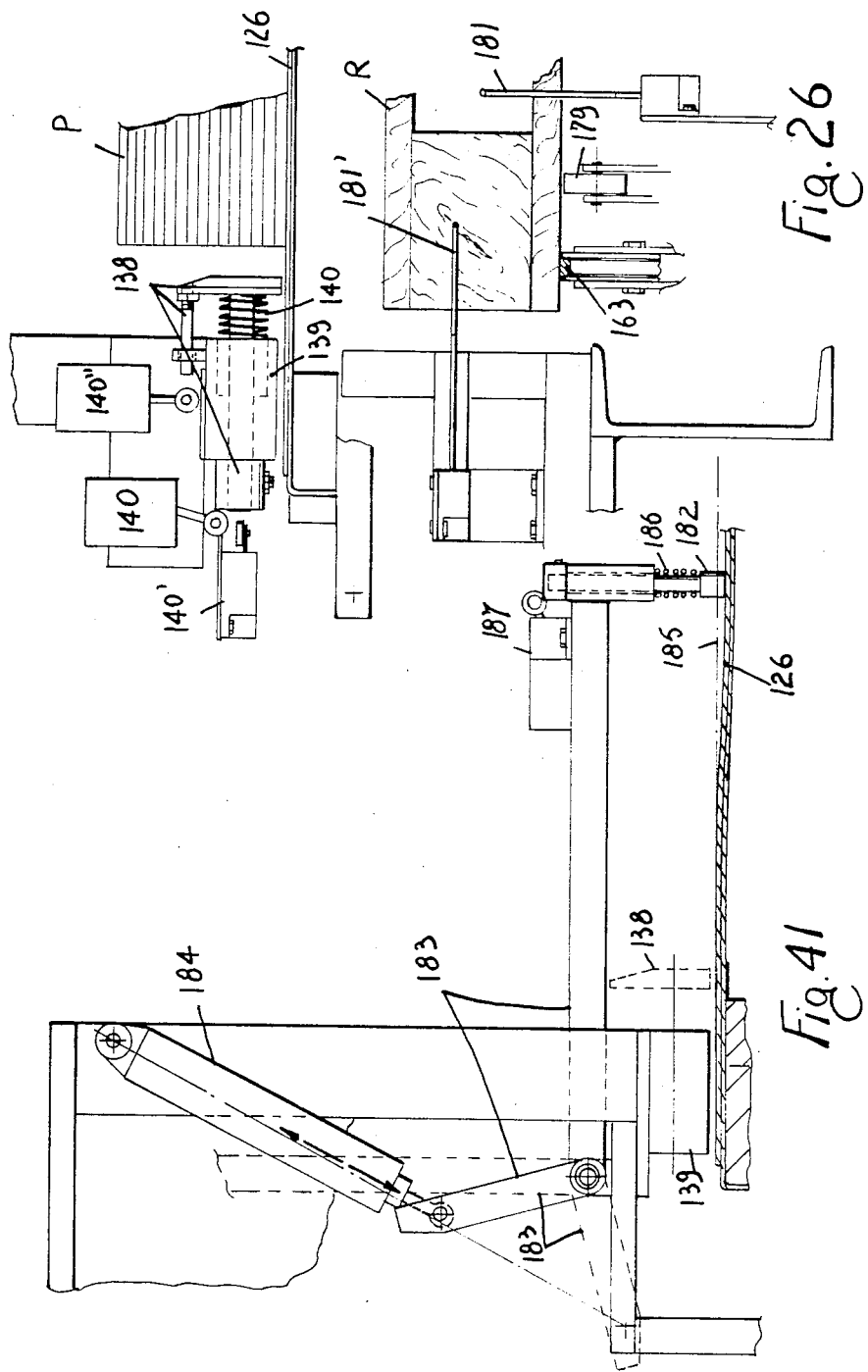

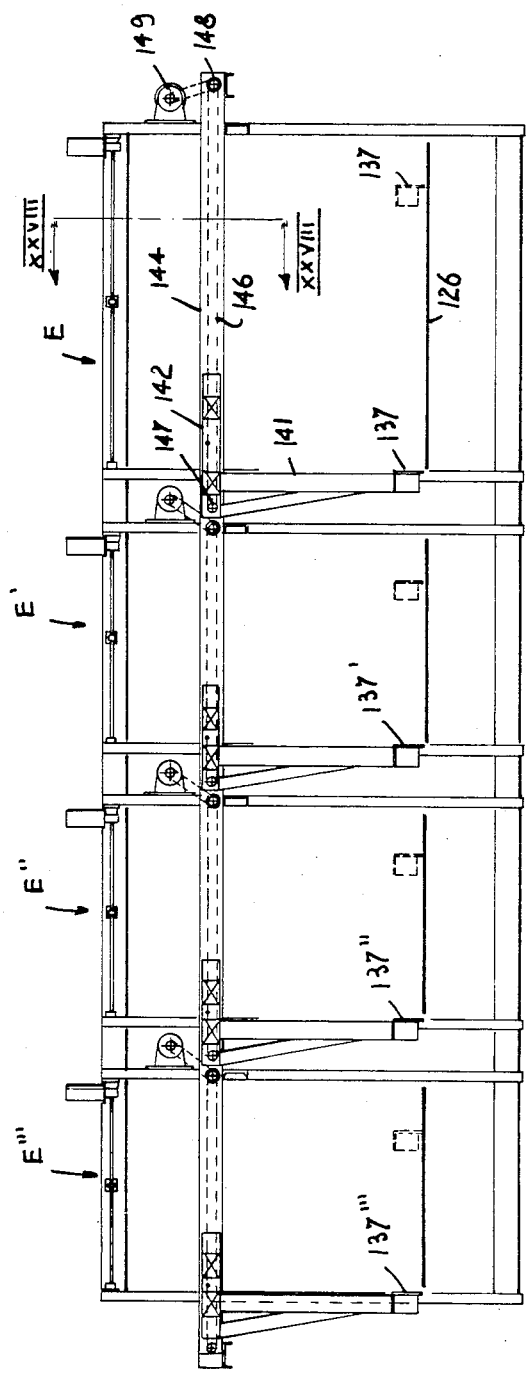

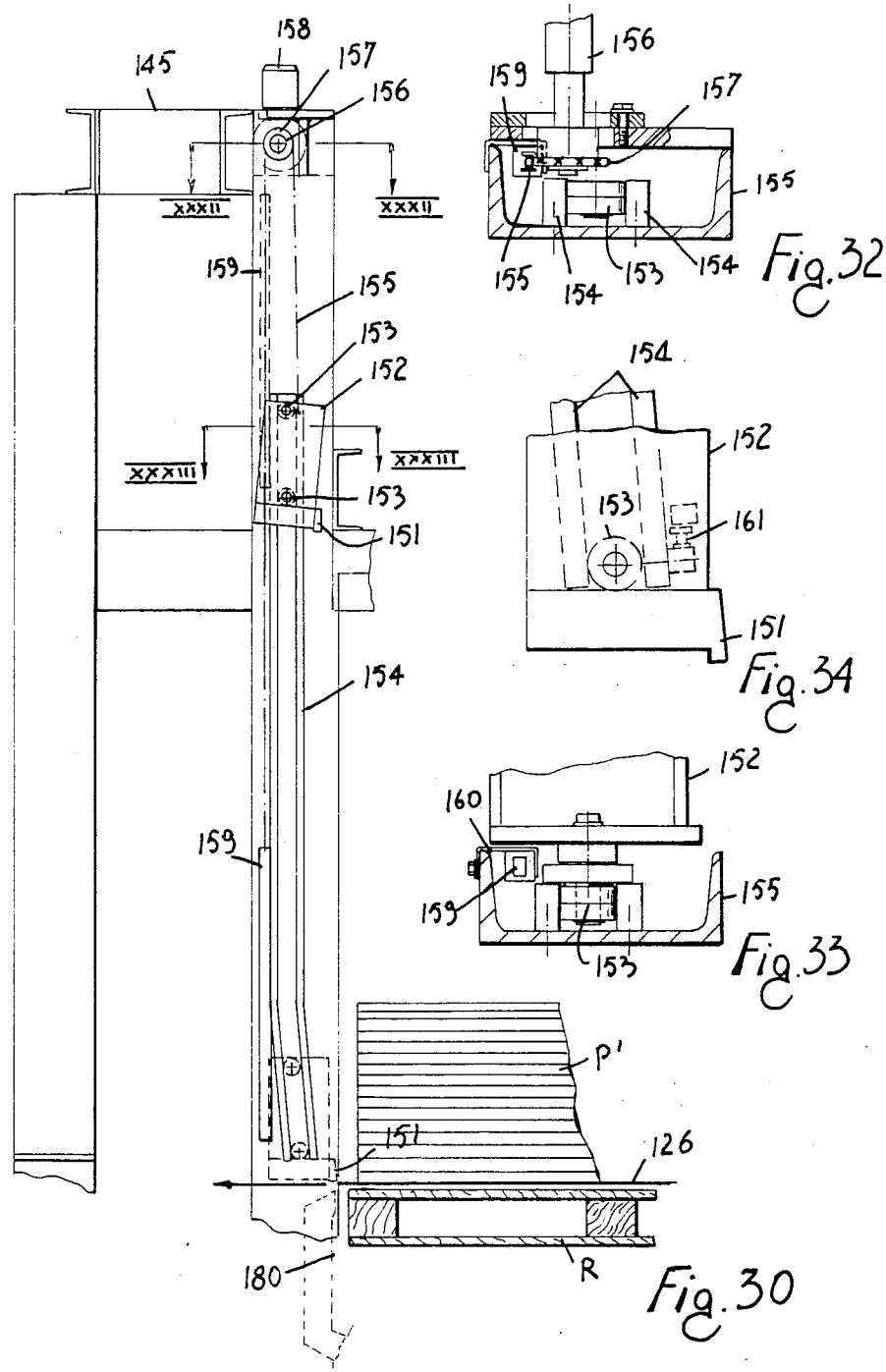

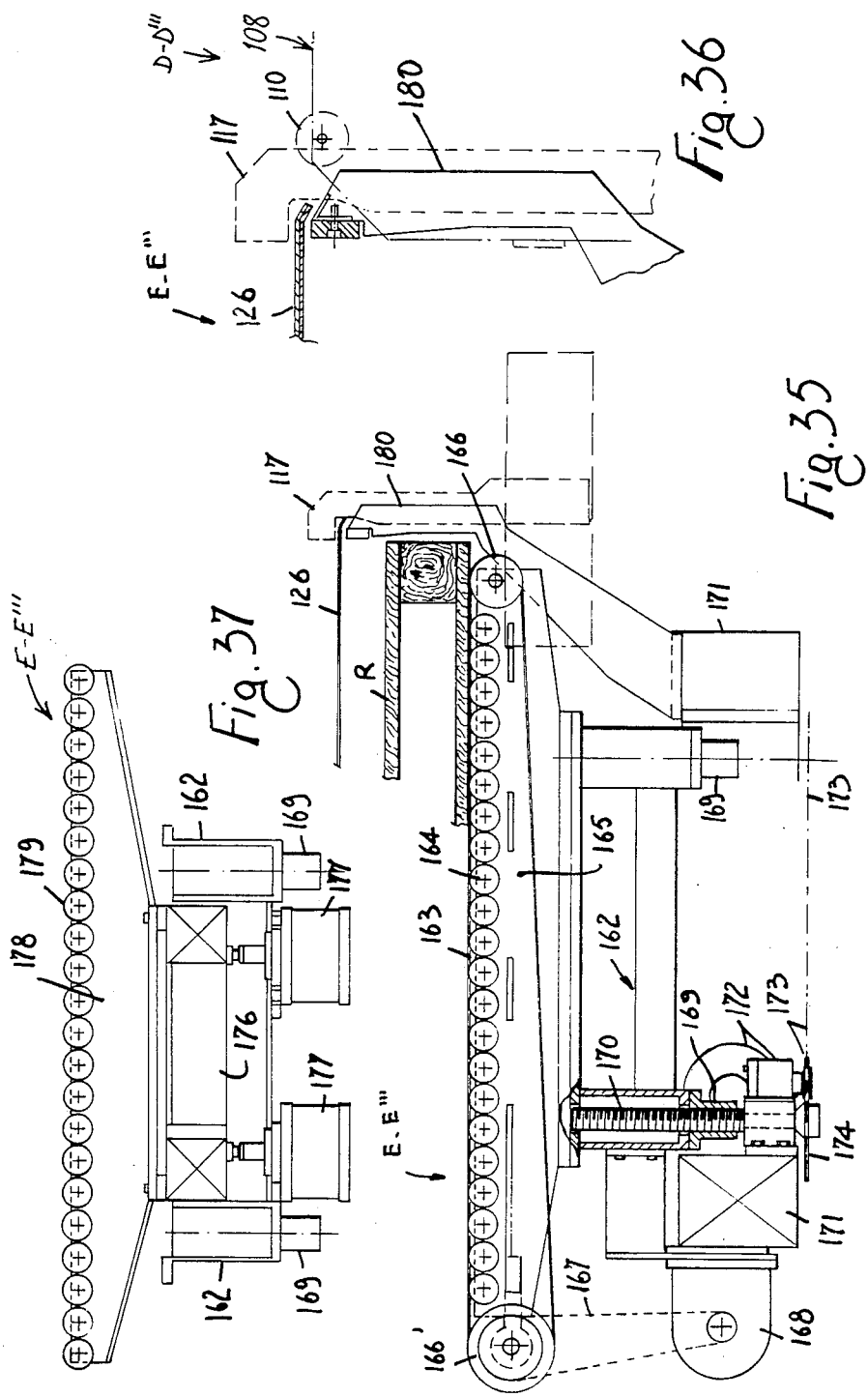

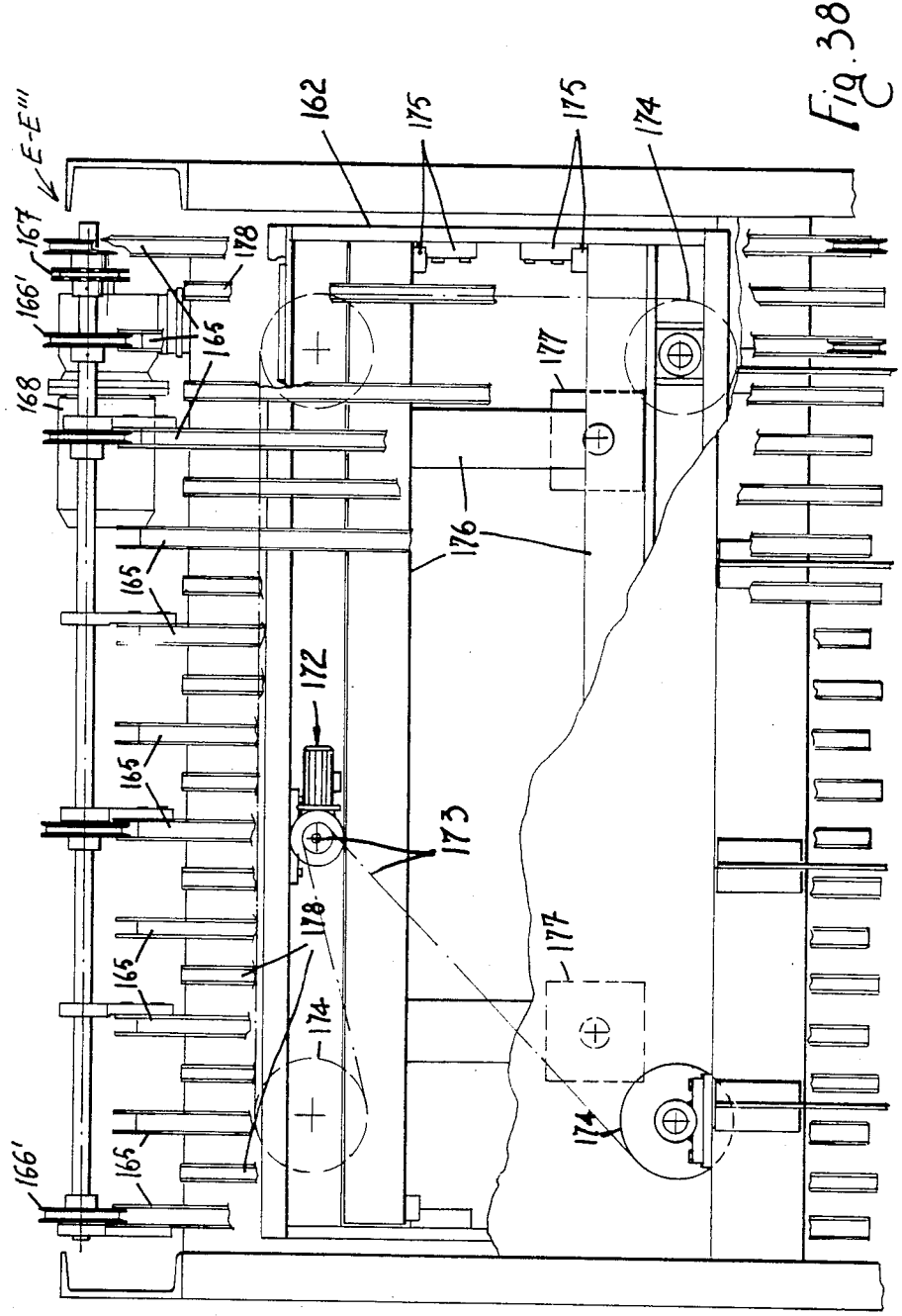

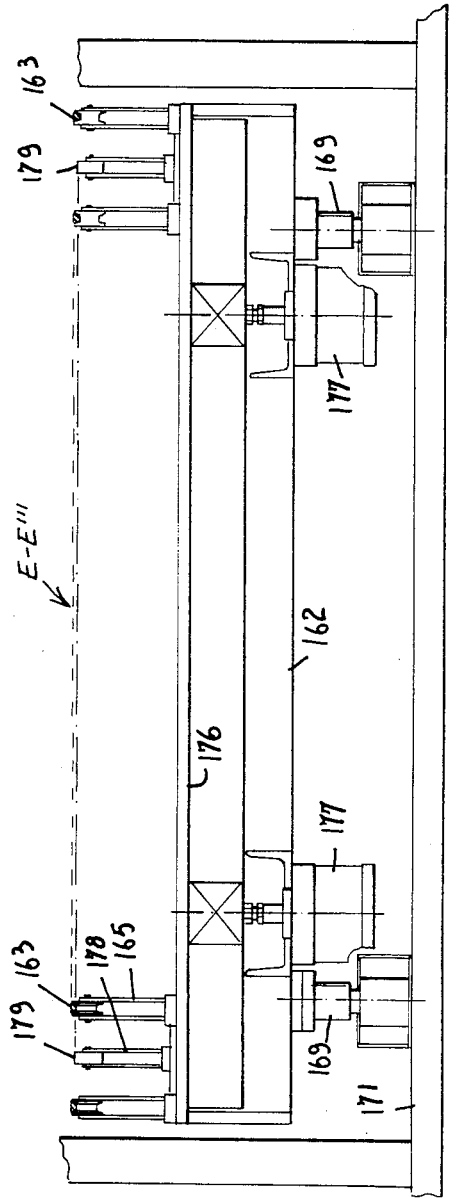
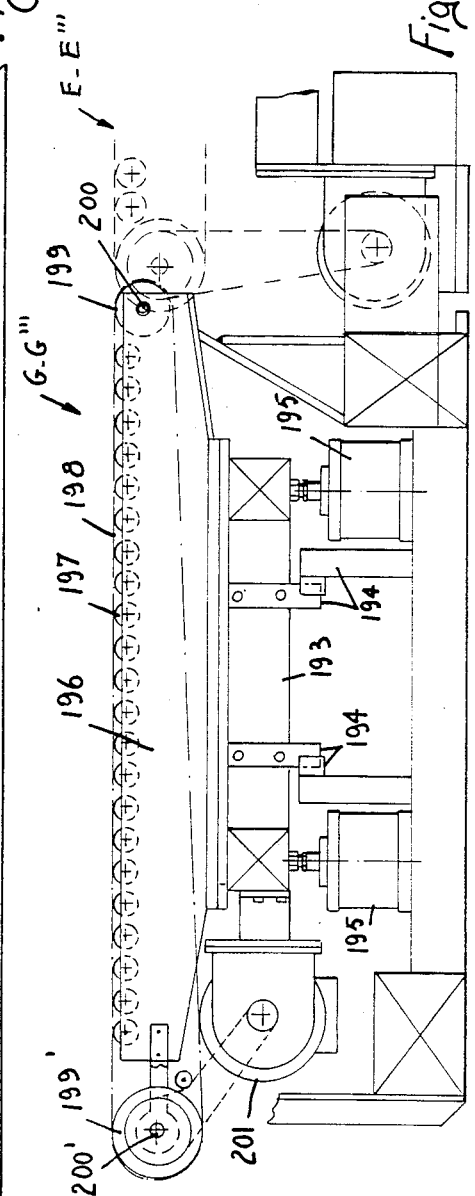

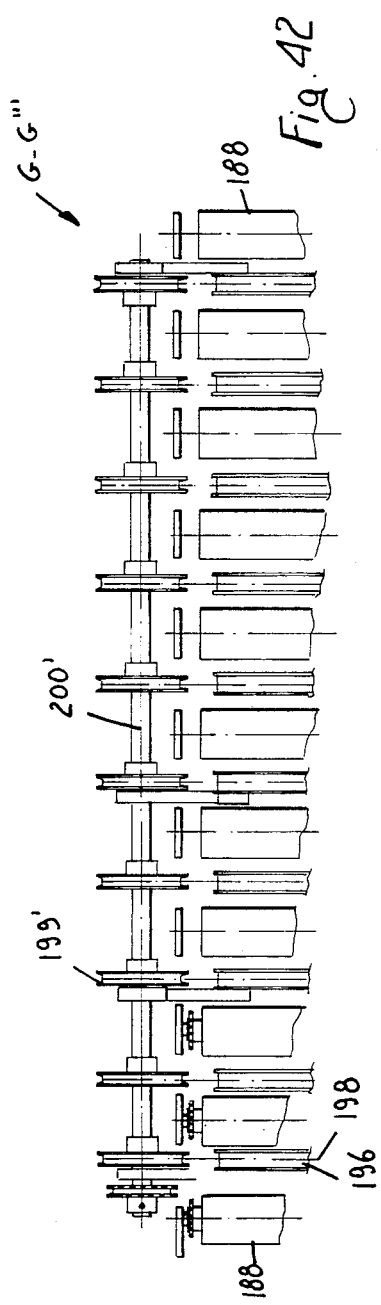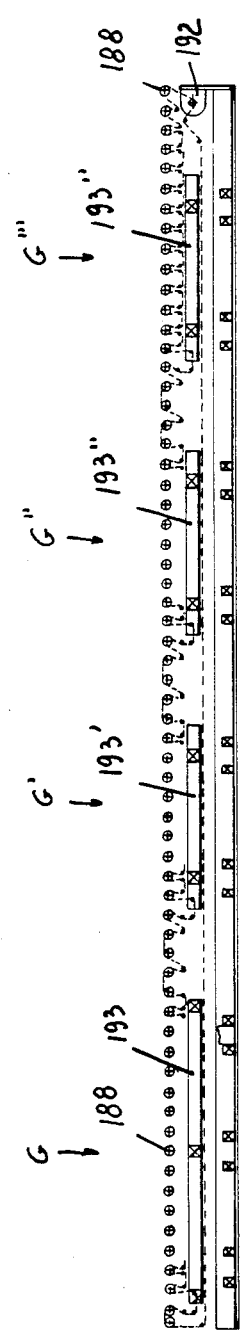

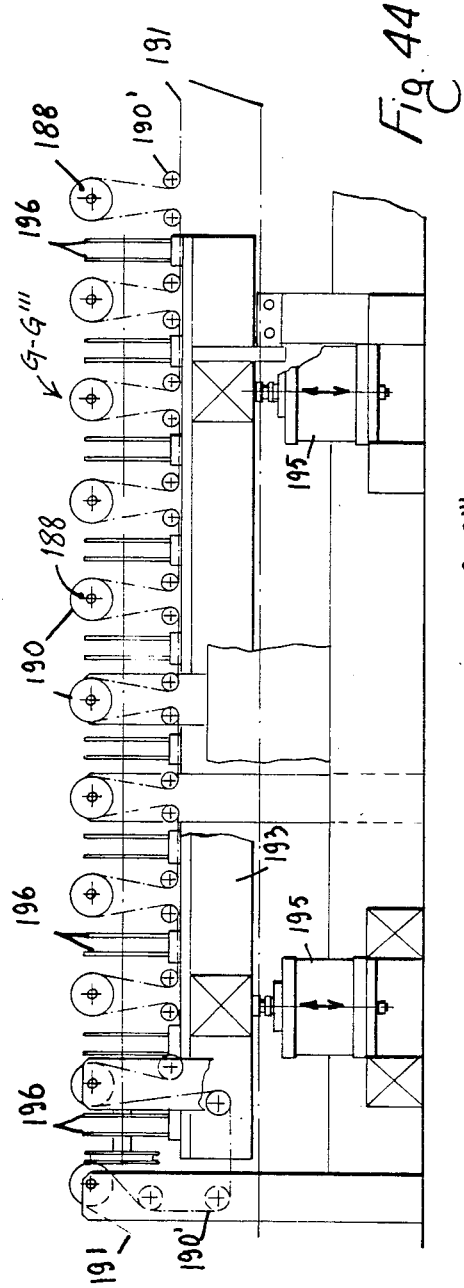
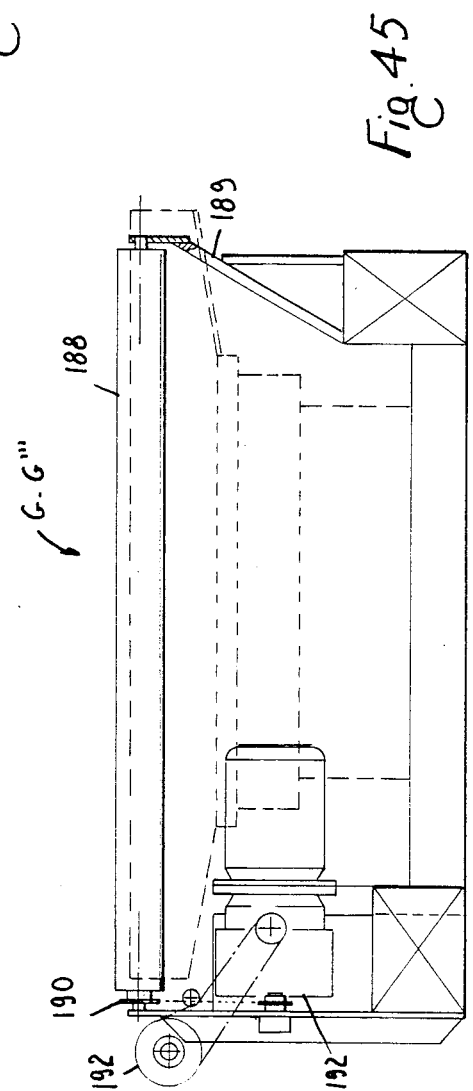

4,986,726

PLANT FOR AUTOMATICALLY STACKING AND ORDERLY ARRANGING PACKS OF PANELS OF DIFFERENT SIZES

This application is a continuation of application Ser. No. 871,331, filed June 6, 1986, abandoned.

FIELD OF THE INVENTION

The present invention relates to a plant for stacking automatically, on respective lifting platforms, packs of panels of different sizes coming, in any succession, from either a processing machine such as a dividing machine. The plant according to the invention, subsequently, orderly arranges the stacks of panels from each stacking station adjacent to each other, at respective stations, so as to form parallelepiped assemblies which are then transferred to a discharge station, for example to a strapping station or to a plastic film wrapping station, after having been arranged on a pallet or other supporting or protecting means.

BRIEF DESCRIPTION OF THE DRAWINGS

The characteristics of said plant and the advantages resulting therefrom will be apparent from the following description of a preferred embodiment thereof, shown by way of example in the accompanying drawings, in which:

FIG. 1 is a diagrammatic top plan view of the plant;

FIG. 2 shows the constructional details of the station indicated at A in FIG. 1, said station being shown in its operative working condition and as seen from the section line II—II of FIG. 1;

FIG. 3 is a side elevational view of the stations A-A';

FIG. 4 is an elevational view of the rear side of the abutment or stop bar which operates at the station A, said stop bar being shown in the active working position thereof;

FIG. 5 is a side elevational view of the stop bar of FIG. 4;

FIG. 6 is a front elevational view of the powered rollers of the station A';

FIG. 7 is an enlarged side elevational view of one of the spring-loaded rollers of the presser device at the stations A-A';

FIG. 8 is a side elevational and partly sectional view of the presser device at the stations A-A';

FIG. 9 shows some constructional details of the presser device of FIG. 8, on the section line IX—IX;

FIG. 10 is a top plan view showing other constructional details of the presser device/stop bar assembly at the station A;

FIG. 11 is a front elevational view of one of the stations designated B-B', B'', B''' in FIG. 1, said station being shown in an intermediate step of its working cycle;

FIG. 12 is a fragmentary side elevational view of the rocking structure with idle rollers of one of the stations B;

FIG. 13 is a side elevational view of the rocking structure with the powered rollers of one of the stations B;

FIG. 14 is a front elevational and partly sectional view of the rocking structure with powered rollers of one of the stations B, and showing partially the underlying lifting platform;

FIG. 15 is a side elevational view of the mechanism for the synchronous actuation of the discharge comb-like members of the station B;

FIG. 16 is a front elevation of a detail of the mechanism of FIG. 15;

FIGS. 17 and 18 are side elevational and top plan views, respectively, of the powered rollers at the stations C, C', C'', C''' of FIG. 1, for transferring the packs of panels between the stations B-B'-B''-B''';

FIG. 20 shows details of the lifting platform of FIG. 19, taken on the section line XX—XX;

FIG. 21 is a side elevational view of the plurality of means operating in the lower portion of the stations B and in the adjoining stations D-D'-D''-D''' of FIG. 1;

FIG. 22 shows a detail of the means of FIG. 21, taken on the section line XXII—XXII;

FIG. 23 is a side elevational view of the movable table which operates at each of the stations E-E'-E''-E''';

FIG. 24 shows some details of one of the carriages for the table of FIG. 23, taken on the section line XXIV—XXIV;

FIG. 25 is a front elevational view of the drive shaft for actuating the table of FIGS. 23 and 24;

FIG. 26 is a front elevational view of a portion of the border area between the stations B-E of the plant, as seen from the section line XXVI—XXVI of FIG. 1;

FIG. 27 is a side elevational view of the means operating in the upper portion of the station E of the plant;

FIG. 30 is a side elevational view of the retaining bar which is operative at the border area between the stations D-E of the plant;

FIGS. 32 and 33 show further constructional details of the bar of FIG. 30, as seen on the respective section lines XXXII—XXXII and XXXIII—XXXIII;

FIG. 34 is a fragmentary side elevational view of one of the end carriages of the bar of the preceding figures, shown at the bottom end of its stroke;

FIG. 35 is a side elevational view of the bed with powered belts which operates at the stations E of the plant, said bed being shown in its bottom position at the beginning of a cycle;

FIG. 36 is an enlarged view of a detail of the bed of FIG. 35;

FIG. 37 is a side elevational view of the bed with its idle rollers which operates at the stations E of the plant;

FIG. 38 is a top plan view of the assembly of beds of FIGS. 36-37;

FIG. 39 is a front elevational view of the assembly of FIG. 38;

FIG. 41 is a side elevational view of the retractable sensor which operates at the stations E of the plant;

FIG. 42 is a fragmentary top plan view of the means operating at the stations G-G'-G''-G''' of the plant;

FIG. 43 is a diagrammatic front elevational view of the power means for the rollers of the stations G of the plant;

FIG. 44 is a front elevational view of the stations G;

FIG. 45 is a side elevational view of the roller frame of the stations G and its power means;

FIG. 46 is a side elevational view of the bed with powered belts which operates at each of the stations G of the plant.

DESCRIPTION OF THE PREFERRED EMBODIMENT

Figure 19:
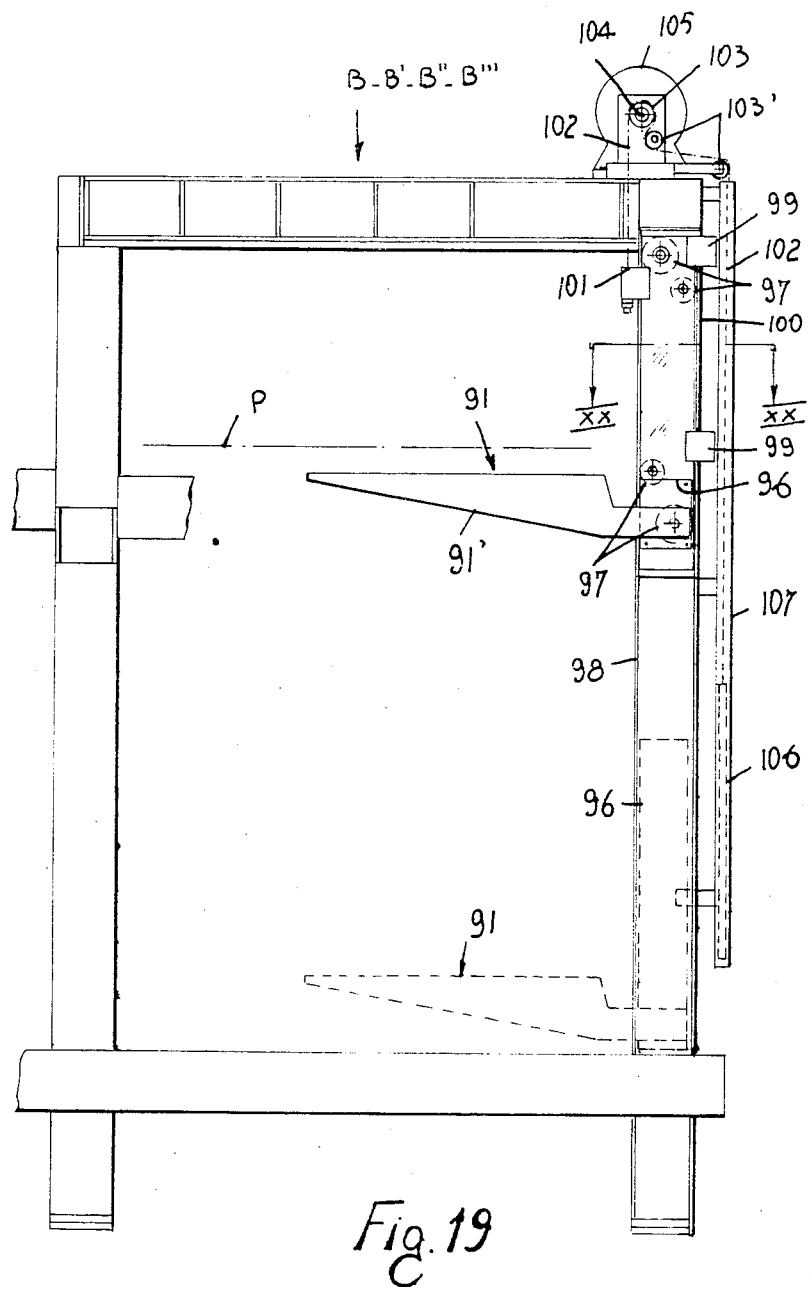
FIG. 19 is a side elevational view of one of the lifting platforms which operate at the stations B of the plant.

In FIG. 1, the numeral 1 indicates a transport runway with parallel co-planar belts, which advances the packs of panels coming from a dividing machine in the direction of the arrow F. Downstream of the latter machine there are arranged, preferably, devices of conventional design (not shown) for changing, if necessary, the orientation of said packs of panels by a 90° rotation, so that, on said runway 1, said packs will be arranged either side by side or in end-to-end sequence depending upon whether or not they have been rotated by 90°. Usually, the 90° rotation is imparted to the packs of panels having an elongated rectangular base, so that the longer dimension thereof will be transverse to the runway 1.

With reference to FIGS. 2 and 3, it will be noted that the powered belts of the runway 1 are mounted on vertically movable frames and that said belts are arranged between fixed planar and co-planar supports 2 which, preferably, are coated with suitable material to avoid marring the panels. When the belts of the runway 1 are activated, they are lifted from said supports 2 which, thus, are prevented from contacting the packs of panels being transported. The transport runway 1 joins with an operative station A, where said runway 1 comprises, instead of said supports 2 and co-planar therewith, small idle wheels 3 supported by stationary frames having their axes oriented in the direction F in FIG. 1. The packs of panels to be stacked by the installation of the invention, are stopped at the station A by abutment of their front sides against a transverse stop or abutment bar 4 (see also FIGS. 4 and 5) which, usually, is in a lowered position and which is lifted only when scraps are present on said runway 1 and are to be transported beyond the station A towards collecting means (not shown).

The abutment bar 4 comprises a vertical face to be contacted by the packs of panels P, and a rear face provided, in symmetrical arrangement, with a tern of vertical rods 5 slidable in guide supports 6 which are secured to a support beam 7 forming a part of a carriage structure (described hereinafter) rotatably mounting, by means of bearings 8, a shaft 9 which, through end pinions 10-10', meshes with racks 11-11' which are formed on or attached to the end racks of said rods 5. Secured to said beam 7 are two cylinder-and-piston units 12-12' of the pressurized fluid and double acting type, the piston rods of which are connected to said abutment bar 4 which, due to said parts 9-10-11, will be moved by said units though remaining in a horizontal position. It will be noted in FIG. 4 that said abutment bar 4 is formed with recesses 13 in the lower side thereof to avoid interfering with the underlying members of the plant.

It will be noted in FIGS. 2 and 3 that when the pack, or packs, of panels abuts against the abutment bar 4, a suitable sensor (not shown) detects this condition and, at least, causes the powered belts of said runway 1 to be lowered, whereby said packs P come to rest on the idle wheels 3. Under the side of the packs P abutting against the abutment bar 4 there is provided a horizontal runway of rubber-coated rollers 14, similar to each other and having their axes parallel to those of the wheels 3, said rollers being rotatably mounted in cantilever fashion on respective supports 15 which are fixed to the top side of a frame 16 the ends of which are pivotably connected, through parallel links 17, to a structure 18 comprising adjustable limit switches 19-19' co-operating with said links.

Pivotably connected to said structure 18 are the body portions of fluid-operated double-acting cylinder-and-piston units 20-20', the piston rods of which are connected to end extensions 16' of said frame 16. The rollers 14, thus, may be raised and lowered while remaining in a horizontal condition. The hubs mounting said rollers 14 have keyed to their end portions protruding from the rear side of said supports 15, sprockets 21 having the same characteristics and driven, via a chain 22 and idle sprockets 23 with chain-stretcher 24, by a sprocket 25 which is keyed on the shaft of a motor-reducer 26 mounted on the frame 16. A torque limiter 27 is associated with the motor-reducer 26. By activating said motor-reducer 26, all the rollers 14 will be rotated at the same speed and in the proper direction to move the packs of panels P in the direction indicated by the arrow F1 in FIG. 1. During the working cycle at the station A, as explained with more detail hereinafter, the frame 16 with rollers 14 will be lifted up to a level equal or slightly higher than the sliding plane or path of movement defined by the rollers 3. Co-planar with the rollers 14 in rectilinear extension therefrom, when in the upper working position (FIGS. 3 and 6), there are provided further identical rubber-coated rollers 28 which, unlike the former rollers, are rotatably mounted in a cantilever fashion on a frame 29 which is fixed to said structure 18. The rollers 28 concern the station A', which is adjacent the station A and connects the latter to the successive station B of the plant. The rollers 28 are kinematically connected, by a sprocket-and-chain drive system 30-31, to a drive unit 32 which, on command, causes said rollers to rotate in the same direction as the rollers 14 with the same surface speed.

Above the edge of the packs of panels P contacting against the abutment bar 4, and opposed to said powered rollers of both the stations A-A', there is provided a row of parallel and grooved rollers 33. These are preferably coated with rubber or any other suitable material and are rotatably and elastically mounted, as indicated at 34, on a presser 35 which is parallel to said abutment bar 4 and is provided at the ends thereof with plates 36. These plates, through rollers 37, slide on vertical guide plates 38 which are fixed to said beam 7 rotatably supporting a longitudinal shaft 39 which is actuated by a motor-reducer unit 40 rotatable in both directions and which is provided at the ends thereof with pinions 41-41' in mesh with vertical racks 42-42' secured to said plates 36. At one side of the presser there is mounted parallelly, through an articulated parallelogram comprising links 43, a small bar 44 which is provided at the lower side thereof with idle rollers 45 parallel to the rollers 33 and normally protruding downwards beyond said rollers 33. Adjustable abutments 46 (FIG. 8) define the rest position of the bar 44, said position being also detected by a sensor 47. The structures 7-38 and 18-29 are fixed to a powered carriage structure (not illustrated because of conventional design) which, on command, can move the assembly of the members of FIG. 2 along the length of the runway 1, as indicated by the arrows K.

The stations A-A' operate as follows. When the pack or packs of panels contact the abutment bar 4, the belts of the runway 1 are lowered and, in due course, the structure 16 is raised, whereby the rollers 14 will engage the lower side of said packs and will be located either co-planar or slightly above the path of travel or sliding plane formed by the idle wheels 3 supporting said packs. In due course, the presser 35 is lowered to engage said pack with its rocking rollers 33 and press them properly by the action of the springs 34, and is stopped when the feeler 44, also engaging said packs through its small wheels 45, is lifted to modify the status of the sensor 47 that, automatically, disactivates the motion unit 40. The assembly of members of FIG. 2 is now moved through a short stroke in the direction of the arrow K in order to move the packs of panels clamped between the rollers 14-33 away from the packs possibly resting on the runway 1, so as to avoid any interference therewith.

In the next step, the rollers 14 and 28 are activated, whereby the packs of panels P will be transferred in single file in the direction of the arrow F1, from the station A to the station A' and then toward the station B. The presence of the torque limiter in the drive of motor-reducer 26 eliminates undesired accelerations and de-celerations in the handling of the packs of panels, which might disassemble said packs. When the front side of the leading pack P co-operatingly engages a sensor 48 (FIG. 3), the motor-reducer 26 is stopped and the rollers 14 are lowered, while the rollers 28 of the station A' remain activated to feed the pack (properly spaced from the succeeding pack) to the station B of the plant. When the leading pack has moved past the sensor 48, if permitted by the operating program of the plant, the rollers 14 are lifted again and the motion unit 26 is reactivated automatically to repeat said cycle. When the row of packs of panels at the station A has been exhausted, the presser 35 is lifted, the rollers 14 and 28 are stopped and the former of these rollers are lowered, whereafter the assembly of members of FIG. 2 is moved in the direction of the arrow K' back to the original position thereof, while in due course the belts of the runway 1 will be lifted again, and will feed new packs of panels to the station A to repeat said cycle. The positioning of the sensor 48 at the station A' is such as to avoid always a simultaneous clamping of two packs of panels between the rollers 28 and the rollers 33 of the presser 35 thereabove.

According to a minor constructional modification, the cyclical stopping of the packs of panels at the station A, while they are being transferred to A' and then to B, might be effected by the motion unit 26 and, therefore, with the aid of the torque limiter 27, without lowering the rollers 14. In this instance, the rollers 14 or some of these rollers that are in proximity of A', will be driven by the chain 22 free trip connections, whereby when the motor 26 is stopped, those rollers 14 supporting the pack that engages the station A' may have a free idle rotation.

With reference to FIG. 11, we will describe one of the station B-B'-B"-B'" receiving the packs of panels from the stations A-A' in single file and suitably spaced apart. In line with the presser 35 there is provided a similar presser 49 associated with all the stations B-B', B'" and provided with rubber-coated and spring-loaded rollers 50 similar to those of the preceding presser, and actuated by a vertical guide/slide system, with pinion/-rack device and with oppositely-rotatable motor-reducer, similarly to the presser 35 described above. The presser 49, through a sensor (not shown) mounted thereon, detects the level position of the presser 35 upstream thereof and automatically adjusts itself to said position. At each station B of the plant, below the respective rollers 50 of the presser 49, there are provided parallel and identical rubber-coated rollers 51 constituting a runway which is in line and coplanar with that of the rollers 28 at the station A', said rollers 51 being supported by a frame 52 which is pivoted at 53 to a stationary structure 54 and, therefore, can oscillate parallelly to the direction of movement indicated by the arrows F1, said frame being connected to fluid-operated double-acting cylinder-and-piston units 55 which, in turn, are secured at 56 to a stationary frame 57, the arrangement being such that, on command, the assembly 51-52 may be moved from the position shown in solid lines to the position shown in broken lines in FIG. 11, and vice versa.

The rollers 51 are powered by means of a sprocket-and-chain drive 58-59 and a motor-reducer unit 60 mounted on the rocking frame 52, as shown in FIGS. 13 and 14. The side of the pack of panels that is opposite the side which is clamped between the rollers 50-51 is supported by rubber-coated idle rollers 61 journaled on a comb-like frame 62 (FIG. 12) capable of oscillating parallelly to said support structure 64. Also connected to this structure are fluid-operated double-acting cylinder-and-piston units, diagrammatically symbolized by the arrow 65, whereby, on command, said assembly 61-62 may be moved from the position shown in solid lines to the position shown in broken lines, and vice versa. The structure 64 is a carriage structure and can slide on stationary guides 66 which are normal to the direction of movement F1 of the panels at the stations B, and have mounted thereon racks meshing in a conventional manner with the end pinions of a shaft which is rotatably supported by said structure 64 and is connected to a motor-reducer unit having a double direction of rotation (not shown). The arrangement is such that the distance between the rollers 51-61 changes automatically, depending upon the size of the packs of panels entering the stations B of the installation. The frame 62 provided with idle rollers 61 has affixed thereto vertical wings 67 which, viewed from above, have a substantially V-shaped configuration and which are aligned with each other so as to form a grid-like barrier that, when the frame 62 is in its active position, is disposed on an imaginary vertical plane which is parallel to the direction of movement F1 of the packs of panels at the stations B of the installation. Opposed to said grid-like barrier and parallel thereto, there is provided (solidary with the stationary structure 54 mounting the rocking frame of the powered rollers 51) a guide 68 which at the bottom is also of grid-like formation to ensure the required freedom of movement to said rollers 51 (see also FIG. 11 and 14).

With reference again to FIG. 11, it will be seen that suitably spaced between the rollers 51-61 there are the flat-shaped ends of the teeth 69-69' of respective comb-like structures 70-70', which are supported at the ends thereof by pairs of links 71-71' which are pivoted to supports 72-72' integral with the structures 54, 64. The body of the comb-like structures 70-70' has pivoted thereto, in the appropriate number and position, as shown at 73-73', connecting rods 74-74' the top ends of which are connected to cranks 75-75' (see FIG. 15), the crank 75 being keyed to the end of a shaft 76 which is rotatably supported, through bearings 77, by the structure 54 and which is parallel to the guides 66. The crank 75', on the other hand, is keyed to a bushing 78 which is rotatably supported, through bearings 79, by the structure 64, and which is so formed in the inner side thereof as to co-operate with the longitudinal splined portion 76' of said shaft 76. Said bushing 78 and shaft 76 have normally secured thereto two levers 80-80' which are pivotably connected to the piston rods of respective fluid-operated double-acting cylinder-and-piston units 81-81' having their body portions secured to the structures 54, 64.

This solution permits a synchronous actuation of the comb-like frames 70-70' which, following the actuation of the units 81-81', may be moved from the position shown in solid lines to the position shown in broken lines in FIG. 11, and vice versa. From FIGS. 11 and 12 it can be seen that, pivoted at 82-82' to the structure 64, through parallel links 83, so as to be pivotable parallelly to F1, there is a further comb-like frame 84 having teeth 84' located between the teeth of the frame 62 and fixedly provided at the ends thereof with vertical plates 284 exactly aligned with each other. Frame 84 is connected to one or more cylinder-and-piston units which are diagrammatically symbolized by the arrow 85, which normally hold it in the broken line position of FIG. 11, and which, on command, move it to the solid line position to operate on the side of the pack of panels which is opposite to that facing the stationary guide 68. With reference to FIG. 1, it will be seen that, depending upon the size of the pack of panels reaching the station B and depending upon the operative stage of the installation, the programming device controlling the operation of the installation establishes at which of the four stations B a pack must be stopped to be stacked on an underlying lifting platform as discussed below.

Arranged downstream of each station B-B'-B''-B''' are respective mechanical abutments indicated at 86-86'-86''-86''' in FIG. 1, the first-mentioned three, being of retractable type and the last-mentioned one being stationary and constantly operative. One of the retractable abutments 86 is shown in FIG. 13, and it will be seen that it comprises a slide 86 which is vertically movable on a stationary guide 87 located below the runway defined by the powered rollers 51, said slide being connected to a fluid-operated double-acting cylinder-and-piston unit (not shown) which, on command, will move it from the solid line position to the lifted broken line position, or vice versa. Micro-switches 88, only one of which is shown in FIG. 13, reveal the rest and the active positions of the slide 86 to the programmer. Again in FIG. 13, it will be seen that said guide 87 is at a small angle Z with respect to the vertical, whereby when the slide 86 is lowered after the latter has stopped the pack of panels at the desired station B, said slide 86 will move slightly away from the front side of said pack P, so as to avoid disordering and marring it. The front side of the slide 86 facing the stations A—A of the installation is such as to present a perfectly vertical face when said slide is in its operative top position, regardless of said inclination Z of the assembly 96-87. Before the pack of panels P reaches the lifted abutment 86 (see FIG. 1), the front side of said pack is detected by a first sensor 89 which controls the decrease of the speed of advance of said pack (see motor-reducer unit 60 in FIG. 13) so that said pack is not put out of order when engaging against the abutment 86, and a second sensor 90 which stops said motor-reducer unit 60 definitively. Similar sensors 89'-90', 89''-90'' and 89'''-90''' are provided for the stations B'-B''-B'''.

When the pack of panels has been properly stopped at one of the stations B (see FIG. 11), the teeth 69-69' of the comb-like structures 70-70' are already in their lifted position, below the pack, ready to take over the rollers 51-61 when in due course, they will be lowered and moved away. Thereafter, said comb-like structures 70-70' are also moved away from the pack, which will be softly transferred onto either a lifting platform 91 or a pack of panels previously deposited thereon. The jacks 85 (FIG. 11) are then activated and urge the grid-like formation constituted by the vertical small plates 284 against the adjacent side of the discharged pack of panels P, whereby to force said pack to be positioned uniformly with its opposite side against the stationary guide 68. The stack of panels which is progressively built up on the lifting platform 91 is thus quite orderly arranged. Thereafter, the lifting plateform 91 is lowered by the same extent as the pack transferred thereonto and the station B will again be in a condition permitting a new operative cycle, as described above. FIGS. 17 and 18 show one of the sets of rubber-coated rollers 92 arranged at the stations C-C'-C'' of the installation, in line and co-planar with the rollers 51 when in their active working position, said rollers being rotatably supported by a stationary structure 93 and being actuated by a respective motion unit 94 with a sprocket-and-chain drive 95, so as to be rotated concurrently and at the same speed as said rollers 51. The rollers 92 constitute a bridge permitting an appropriate transfer of the pack of panels from a station B to a next succeeding station. Rollers which are similar to the rollers 92 though freely rotatable (not shown), may be provided on the opposite side of the stations C and may be supported by a structure which is secured to the carriage 64 to better support the pack while during its transfer between said stations B.

It will be seen in the FIGS. 19 and 20 that each lifting platform 91 has a loading plane which is formed by a plurality of horizontal arms 91', disposed normally to the direction of movement indicated by the arrow F2, and parallel and suitably spaced apart from each other, said arms being suitably shaped to permit the platform to reach the highest level when it is empty, as shown in FIG. 14. The arms 91' of said platform are secured in cantilever fashion at an end thereof to a common carriage beam 96 provided at the ends thereof with wheels 97 sliding within a pair of U-shaped uprights 98 and comprised in the fixed framing of the stations B of the installation, said carriage beam being provided at the ends thereof with sliding members 99 which are adapted to slide with enough precision on rectilinear vertical guides 100 secured to said uprights 98. At the two ends of the carriage 96, there are connected at 101 the ends of two chains 102 only one of which is shown in FIG. 19, said chains being passed around sprockets 103 keyed on a shaft 104 which, in turn, is rotatably supported at the top of the stationary framing of the station B and is actuated by an oppositely-rotating motor-reducer unit 105. The outer end of the chains 102 is connected to counterweights 106 keeping said chains in a suitably taut condition and slidably guided within stationary housing 107. Sprockets 103' ensure a correct co-operation of the chains 102 with the sprockets 103 and a correct guidance of said counterweights into the respective guide housings.

At the stations B-B'-B''-B''' the packs of panels of different sizes are stacked on each other over the underlying lifting platforms 91, according to the principle requiring panels of the same size on each platform to form a stack of a pre-established height, whereafter said lifting platform 91 is moved automatically to its lowest position, as shown in broken lines in FIG. 19. In this figure, the platform 91 is shown in solid lines in its highest position, and P indicates the bottom of the pack of panels when it is about to be deposited on the lifting platform.

In FIG. 21, it will be noted that, when the platform 91 is completely lowered, the stack of panels P built up thereon will engage and will be supported by a bed 108 extending both in the station B and adjacent station D and formed by a plurality of rectilinear, parallel and co-planar frames 109 which are suitably spaced apart and are disposed with their longitudinal axes in the direction of the arrow F2, and which are provided thereover with small idle wheels 110 so disposed as to permit the stack P to be moved in the direction of the arrow F2. Said frames 109 comprise at an end thereof integral extensions 111 pivoted at 113 to a common transom 112 which is secured to said uprights 98.

The pivot 113 is parallel to the direction indicated by the arrow F1. At the opposite end thereof, said frames 109 are secured, through depending extensions 114, to a common transom 115 connected to fluid-operated double-acting cylinder-and-piston units 116 by means of which said bed 108 with the idle wheels may be moved from the solid line position to the broken line position of FIG. 21, and vice versa. When the stack of panels P is positioned on the bed 108, the latter is in the raised horizontal position and the arms 91' of the platform 91 will be lowered below the sliding plane constituted by the small wheels 110.

Between said frames 109 and the teeth or arms 91' of said platform 91 there will be left sufficient spaces to permit the longitudinal movement therebetween of the teeth 117 of a pusher that, prior to said lowering step of the stack P, has moved automatically to the position shown in solid lines in FIG. 21, the arrangement being such that said teeth will protrude, by an aligned portion of suitable extent, from the bed 108, said teeth being secured to a common beam 118 (see also FIG. 22) which is provided at the ends thereof with carriages 119-119' slidable in horizontal U-shaped guides 120-120' located below said bed, parallelly to the direction of the arrows F2 and bridging the station B and D. Said carriages 119-119' are connected to the ends of respective chains 121-121' passed around sprockets 122-122', the latter being keyed to a shaft 123 rotatably supported by the base plate of the installation and connected through a sprocket-and-chain drive 124 to a motor-reducer unit 125 which, when activated, moves said pusher 117 from the solid line position to the broken line position of FIG. 21, and vice versa, with resulting movement of the stack of panels P from the station B to the station E of FIG. 1 (see arrows F2). Thereafter, when said pusher 117 has moved back to its rest position (the lifting platform 91 having already moved back to its top position), said bed 108 will be lowered to the broken line position to avoid interfering with the movable surface of station E during a succeeding working step of this component, as will be explained more completely below. On completion of the operative cycle of this component, said bed 108 moves back to its horizontal position to repeat the cycle described above.

While being transferred from the station B to the station E, said stack of panels P', preferably, is guarded at the sides thereof by suitable containing and guiding structures, not shown in the drawings because they are obvious and easily constructed by those skilled in the art.

At the station E (see FIGS. 23 to 25), the stack of panels P' will be positioned on the surface—coated with protective material, such as synthetic velvet—of a steel table 126 which is secured with two opposite sides thereof on two carriages 127 which are slidable through wheels having horizontal and vertical axes 128 within guide channels 129 having composite cross section and fixed above the guides 120-120' and parallel thereto. Sliding blocks 129' of a material having a low-friction coefficient, such as nylon, engage the lower surface of the table 126 so as to improve the required stretching and planarity thereof. The ends of said carriages 127 are connected at 130, 130' to the ends of respective chains 131 passed around pairs of sprockets 132-132', the latter being keyed on a shaft 134 (see also FIG. 25) journalled on the uprights 98 of the station B and connected through a sprocket-and-chain drive 135, to a motor-reducer unit 136. The operation of these components will be discussed further hereinafter.

If the length of the table 126, in the direction of the arrow F3 of FIG. 1, is longer than the length of the stack of panels P', one or more stacks will be normally arranged after each other on the same table 126, by as many strokes of the pusher 117. During these steps, the stack of panels that cyclically is pushed onto the table 126 will push forward the stack or stacks which are already located on said table. In the embodiment shown in FIG. 1 of the table 126 operating at the stations B'''-D''', the operative cycle of the pusher unit 117 is completed after three operative strokes. Conversely, in the embodiment of the table 126 operating at the stations B''-D'', the operative cycle of the pusher unit 117 is completed after two operative cycles. The latter example also emphasizes that the stacks of panels positioned on the table 126 of one of the stations E of the installation may be narrower than said table 126, whereby a plurality of rows of said stacks may be arranged side by side thereon; in the example being considered, two rows of said stacks P' are arranged thereon. This last-mentioned arrangement of the rows of stacks on the table 126 is effected by a pusher 137" that, normally, in the position shown in solid lines in FIG. 1, at one side of the station E and that, on command, is activated in the direction indicated by the arrows F3 to sweep the table 126 transversely and to displace the first row of stacks P' leftwards of the table (when looking at FIG. 1), until the front side thereof abuts against the feeler 138 of FIG. 26, which is slidable in a stationary guide 139, against the action of a spring 140, the displacement of said feeler being progressively detected by a plurality of micro-switches 140-140'-140''. When the micro-switch 140 is activated, the pusher 137 is stopped and is returned to its rest position.

In the next step, said pusher moves the new row of stacks against the previously displaced row to cause a further displacement of this first row, such as to be detected by the second micro-switch 140', whereafter, in the previously considered example, the pusher is returned to its rest position, having thus completed its operating cycle. In the example illustrated in FIG. 1 in connection with the station E', the respective pusher 137 completes its operative cycle after three complete strokes, involving the actuation, additionally, of the third micro-switch 140' of FIG. 26.

Figure 28:
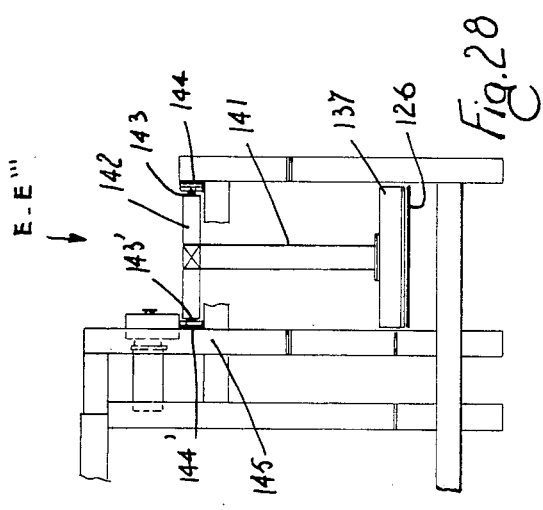
FIGS. 28 and 29 show further constructional details of the means of FIG. 27, both taken on the section lines XXVIII—XXVIII.
Figure 29:
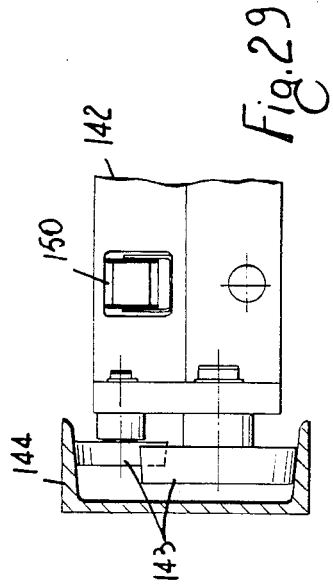

With reference also to FIGS. 27, 28 and 29, it will be seen that each pusher 137-137'-137''-137''' of the stations E-E'-E''-E''' is supported at an intermediate portion by the lower end of a vertical carrier forming therewith an inverted T-shaped structure, the top end of said carrier being secured to a transom 142 which is provided at the ends thereof with carriages 143-143' slidable in horizontal guides 144-144' which are secured to the framing 145 of the station E. Secured to each carriage 143-143' are the ends of respective chains 146 passed around pairs of sprockets 147-147', the latter of which are keyed to a shaft 148 journalled on the structure 145 and connected to a motor-reducer unit 149 through a sprocket-and-chain drive. In FIG. 29, 150 indicates an opening in the transom 142 to allow the passage of the upper stretch of the chain 146. Components similar to those described above, indicated by the same number with a different suffix, are provided at the station E'-E'' and E''' of the installation.

When the rows of the stacks of panels have been orderly arranged at the stations E of the installation, a retaining bar 151 (shown in broken lines in FIG. 1) is lowered at the border area between the stations E-D, extend close to or in substantial contact with said table 126. When said bar has reached its bottom operative position, the motion unit 136 is activated to remove the table 126 from the station E and transfer it temporarily to the station D which, as stated above, has been prepared for this occurrence. Said bar 151 retains the assembly of stacks of panels P' at the station E, and obliges said assembly to softly come to rest onto a plane which substitutes for the said table and which may be formed by a pallet, a protecting panel or merely a roller sliding plane, as will be discussed more fully below.

FIGS. 30-31-32-33 and 34 show various constructional and operating details of the retaining bar 151. This bar is provided at the ends thereof with carriages 152-152' which, through bearings 153, slide within rectilinear guide channels 154-154' which are fixed to the uprights 155 of the framing of said station E, said channels being characterized in that their lower portions are inclined toward the station E, so that said bar 151, during the final portion of its descent stroke, will approach the base of the assembly of stacks P' to be retained, and will move away therefrom when it is lifted. The carriages 152-152' are connected to the ends of respective chains 155-155' passed around sprockets 156-156' keyed to a shaft 157 which is journalled on the structure 145 and is actuated by a motor-reducer 158. The other ends of said chains are connected to counterweights 159 contained by stationary guides 160. Adjustable abutment 161 (FIG. 34) controls the bottom end of the stroke of said bar 151.

With reference to FIGS. 35 to 39, it will be noted that below said table 126, when positioned at the stations E of the installation, is provided a bed 162 with parallel co-planar belts 163 which are directed as indicated by the arrow F2, the upper stretches of said belts being passed around respective rows of grooved idle rollers 164 supported by parallel frames 165 which are fixed to said bed 162. The belts 163, at their ends, are passed around pulleys 166-166' keyed to shafts rotatably supported by said bed 162, one of which is connected, through a sprocket-and-chain drive 167, to an oppositely-rotatable motor-reducer unit 168. The bed 162 is provided at the bottom with four vertical nut-screws 169 arranged at the corners of an imaginary rectangle and co-operating with respective lead-screws 170 rotatably supported by a stationary frame 171 mounting an oppositely-rotatable motor-reducer unit 172. This unit, through a sprocket-and-chain drive 173, co-operates with sprockets 174 keyed on said lead-screws, the arrangement being such that upon activation of said unit 172 said bed with its belts will be raised and lowered, always in a perfectly horizontal condition. As shown also in FIGS. 38 and 39, said bed 162 vertically movably mounts thereon, through four guide slides 175, an additional bed 176 which may be either raised or lowered with respect to the bed 162 by means of four suitably arranged fluid-operated double-acting cylinder-and-piston units 177. The bed 176 mounts frames 178 which are disposed parallelly and equally spaced between the frames 165 and are provided on the upper side thereof with co-planar, parallel, idle wheels 179 which constitute a sliding plane in the direction of the arrow F2 of FIG. 1 and which, on command upon the activation of said units 177, may be positioned at a higher or at a lower level with respect to the handling plane constituted by the belts 163.

Figure 40:
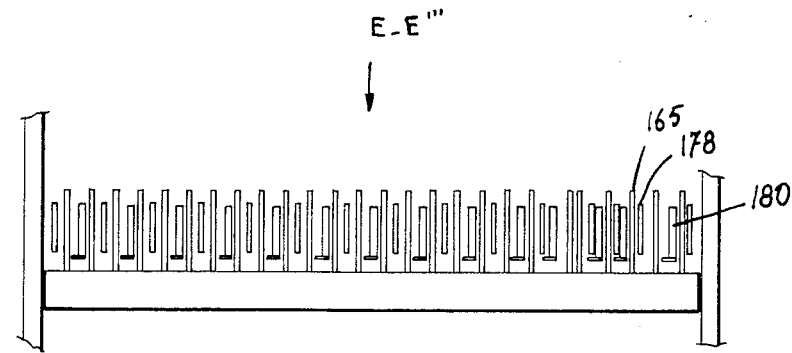
FIG. 40 is a diagrammatic front elevational view of the relative arrangement of the frames with the idle rollers, of the frames with the powered belts and of the teeth on the comb-like abutment of the pallet at the stations E of the plant.
Figure 31:
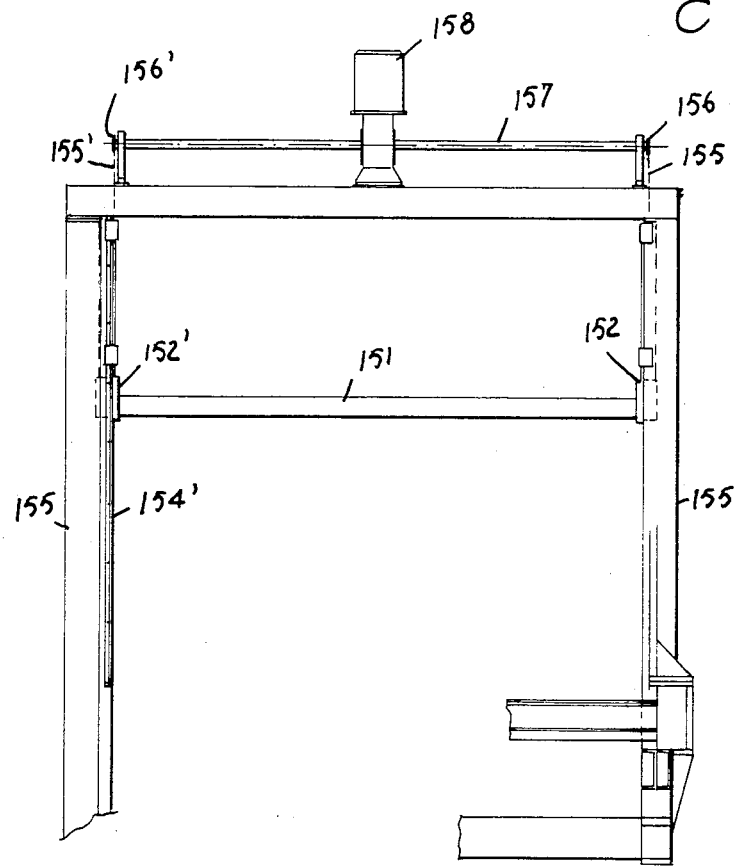
FIG. 31 is a front elevational view of the bar of FIG. 30.

The components described above operate as follows. If the parallelepiped assembly of the stacks arranged previously on the table 126 is to be unloaded onto a pallet R or onto a protecting panel, the bed 162 is initially in its lower position and the bed 176 is also in its lowest position, whereby the powered belts 163 will move in the direction indicated in FIG. 1 by the arrows F4 and will introduce the pallet under the table 126, against comb-like stationary abutments 180 (see FIGS. 35-36-40). Upon this occurrence (see also FIG. 26), micro-switches 181-181' will detect the appropriate presence of the front side of the pallet and communicate this presence to the programmer of the installation. The motion unit 172 is then operated and raises the bed 162 and the pallet R thereon. Prior to this operation, a feeler 182 (see FIG. 4) carried by a rocking arm 183 controlled by a cylinder-and-piston unit 184 is moved from its rest position (shown in broken lines) to its active position (shown in solid lines) so that said feeler will engage the upper surface of the lowermost portion of the table 126 which, in the central area thereof, not supported by underlying members, forms a camber of a few millimeters. The lifting movement of the pallet is automatically stopped when it engages said table 126 and brings the central area thereof on the planarity line 185, which causes the feeler 182 to be raised against the action of the spring 186 so as to trip a micro-switch 187 to stop the motivating unit 172 (FIG. 35). Thereafter, said feeler 182 is moved back to its rest position away from the table 126. It is to be understood that the retractable feeler may be embodied otherwise or may be replaced by any other suitable means.

The operation described above is effected at the beginning of the operative cycle of the stations E of the installation, when no stacks of panels have been transferred onto the table 126, so that when said transfer is effected said table 126 will be supported thereunder due as well to the intimate bearing relationship with the pallet. When the table 126 is withdrawn from the station E and is translated temporarily to the adjoining station D, the assembly of stacks P', previously arranged on said table and held by the retaining bar 151, will be softly deposited onto the underlying pallet R. In the next step, the motion unit 172 will be re-activated to lower the bed 162, whereafter said belts 163 are activated in the direction of the arrow F2 (FIG. 1) to transfer the assembly of pallet and stacks to a station G which will be described hereinafter.

If the assembly of stacks is to be discharged from the station E with no underlying protection, the installation operates as follows. The feeler 182 of FIG. 41 remains in its rest position, the bed 176 with the rollers 179 is raised so as to emerge from the plane of the now stopped belts 163, whereafter the main bed 162 is lifted to an extent which is controlled by a stationary sensor (not shown), whereby the rollers 179 will substantially engage the undersurface of the table 126. When the table 126 is withdrawn from the station E, the assembly of stacks orderly arranged thereon and retained by the bar 151 will be deposited onto the bed with the rollers 179 that have efficiently supported said table throughout the operative cycle. In the next step, the bed with the rollers is lowered so that the assembly of stacks will be deposited on the plane formed by the belts 163, whereafter the general bed 162 is lowered to bring the belts in line with the station G, which is necessary for discharging said assembly of stacks.

With reference to FIGS. 1-42-43-44-45-46, it will be noted that the stations G-G'-G"-G'" are equipped with common co-planar parallel rollers 188 which are disposed with their longitudinal axes in the direction of the arrow F2 and are arranged on an imaginary horizontal plane located appropriately below the plane formed by the belts 163 of the station E when it is in its lower position. The rollers 188 are supported by a stationary frame 189, are provided at an end thereof with sprockets 190 of the same diameter and, through additional idle sprockets 190', are connected to a single chain 191 driven by a motor-reducer unit 192 (FIG. 43), the arrangement being such that said rollers will move the articles deposited thereon, in the direction indicated by the arrows F5 in FIG. 1. At each station G-G'-G"-G'" there are provided respective beds 193-193'-193"-193'" vertically guided by suitable guide slide means 194 (FIG. 46) and either raised and lowered by fluid-operated cylinder-and-piston units 195. Mounted on said beds are frames 196 positioned parallelly between the rollers 188 and equally-spaced therefrom, each frame having mounted thereon small, grooved idle wheels 197 supporting the upper stretch of belts 198 passed around end pulleys 199-199' which are keyed on respective shafts 200-200', one of which is connected to an oppositely-rotatable motivating unit 201. The linear speed of the belts 198 is the same as that of the belts 163 of the stations E. The frame 193 is normally in a lifted up condition so as to present lifted up belts 198 above the rollers 188. In this condition the belts 198, suitably moved in the direction of the arrow F4, will first introduce the pallet or panel R into the stations E of the plant, and thereafter, by a movement in the direction of the arrow F2, will withdraw from said stations E said pallet or panel having thereon the assembly of stacks, or the simple parallelepiped assembly of stacks of panels. The beds 193 with the belts 198 are then lowered, whereby the assemblies of stacks with, if desired, a pallet or panel at the bottom will be deposited onto the rollers 188 which, when activated, will discharge said assemblies in the direction indicated by the arrow F5. Downstream of the transport runway formed by the rollers 188, there may be provided a strapping station or a plastic film wrapping station, or any other means for collecting and disposing of the articles processed by the plant according to the invention.

The pallets or, if desired, the protecting panels R are inserted into the stations G from respective stations H-H'-H"-H'" comprising powered belts which are co-planar and in line with respect to those of the belts 198 of said stations G when in the raised working position thereof, and which are moved at the same speed and in the direction of the arrow F4. No further constructional details of the stations H of the installation are illustrated here, since they are obvious and easily constructed by those skilled in the art.

The activation of the stations H may be either manual or, advantageously, automated.

It is to be understood that this description relates to a preferred embodiment of the invention, omitting the constructional details concerning the various control and safety circuits of the plant, as well as the various electrical circuits and fluid-operated circuits, since they are easily conceivable and can be easily constructed by those skilled in the art.

I claim:

1. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the packs of panels from the dividing machine and feeding said packs, in single file and suitably spaced apart, to transport means operating longitudinally and above the row of lifting platforms, receiving the spaced packs of panels in single file from said transversely operating means, and effecting sorting, soft stacking and orderly arrangement of said packs on the lifting platforms, so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size; means for softly depositing each assembly of stacks, optionally, onto a pallet (R), or directly onto discharging means operating at the lower portion of the same station (E) whereon said assembly is formed;

means (H-G) for feeding automatically to the stations (E) the optional pallets for the assemblies of stacks; and means (G) for moving the assemblies of stacks to a downstream collecting or processing station;

wherein said transport runway (1) feeding the packs of panels from the dividing machine to said lifting platforms comprises horizontal stationary beds (92) of longitudinal grid-like formation, longitudinal powered transport belts co-planar with each other being mounted in void spaces on respective ones of said beds that, on command, are selectively lowered and raised so that said belts protrude above said beds or are retracted below said beds in order to either advance or stop the packs of panels, wherein at the end portion of said transport runway, where the packs of panels are stopped and arranged for transfer toward the row of lifting platforms to be stacked thereon, the stationary portions of the bed whereon said packs rest are replaced by a co-planar structure formed by small idle wheels having their axes disposed so as to facilitate said transfer of the packs; wherein at said end portion of the transport runway there is operatively provided an abutment bar for stopping said packs and for lowering, in co-operation with suitable sensors, said transport belts, said abutment bar being connected to vertically movable means which automatically raises said bar when panels to be conveyed beyond said plant to collecting means arrive from said transport runway.

2. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the packs of panels from the dividing machine and feeding said packs, in single file and suitably spaced apart, to transport means operating longitudinally and above the row of lifting platforms, receiving the spaced packs of panels in single file from said transversely operating means, and effecting sorting, soft stacking and orderly arrangement of said packs on the lifting platforms, so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size;

means for softly depositing each assembly of stacks, optionally, onto a pallet (R), or directly onto discharging means operating at the lower portion of the same station (E) whereon said assembly is formed;

means (H-G) for feeding automatically to the preceding stations (E) the optional pallets for the assemblies of stacks; and means (G) for moving the assemblies of stacks to a downstream collecting or processing station;

wherein said transport runway (1) feeding the packs of panels from the dividing machine to said lifting platforms comprises horizontal stationary beds (92) of longitudinal grid-like formation, longitudinal powered transport belts co-planar with each other being mounted in void spaces on respective ones of said beds that, on command, are selectively lowered and raised so that said belts protrude above said beds or are retracted below said beds, in order to either advance or stop the packs of panels, wherein at the end portion of said transport runway, where the packs of panels are stopped and arranged for transfer toward the row of lifting platforms to be stacked thereon, the stationary portions of the bed whereon said packs rest are replaced by a co-planar structure formed by small idle wheels (3) having their axes disposed so as to facilitate said transfer of the packs; wherein at said end portion of the transport runway there is operatively provided an abutment bar for stopping said packs and for lowering, in co-operation with suitable sensors, said transport belts, said abutment bar being connected to vertically movable means which automatically raises said bar when cut-offs or other panels to be conveyed beyond said plant to collecting means arrive from said transport runway;

wherein at the abutment bar (4) for stopping and guiding the packs of panels there are provided means whereby, when the transport belts of the transport runway (1) are lowered, the side of the packs or packs of panels contacting said abutment bar are clamped between an upper and lower row of parallel rollers (14-33) disposed with their axes perpendicular to the imaginary plane containing said abutment bar, the upper one of said rows being formed by spring-loaded and preferably grooved rollers (33) which are resiliently supported by a presser (35) carried by vertically moving means (36-37-38-3-40-41-42) and provided with a feeler (44) and with sensors (47) to stop said presser automatically when it has a proper interference engagement with said packs of panels, the lower row of rollers (14) being powered by means (21-22-23-24-25-26-27) to cause the packs of panels to advance in single file towards the line of lifting platforms; said assembly of means formed by the rollers and abutment bar being supported at their ends by a powered carriage structure of such construction that when the two rows of rollers have clamped one or more packs of panels abutting against said abutment bar, this roller and abutment bar assembly is moved to a short extent in the same direction of movement as the transport runway (1), so as to move the clamped packs away from the succeeding packs, so that when the clamped packs are moved toward the line of lifting platforms, they do not interfere with any packs remaining on the transport runway, the lower powered rollers (14) being divided into two sequential groups (14-28), the first group (14) that first engages the packs of panels stopped against the abutment bar being mounted on a support structure (16) which, on command, is selectively raised and lowered by suitable means (17-20) and powered by a motion unit (26) through the intermediary of a torque limiter (27) to ensure soft handling of the packs, and the second group of powered rollers (28) being mounted on a stationary structure (29), a sensor (48) being provided between said rollers to cause, upon detection of the front side of a pack, the temporary lowering of the first group of rollers, whereby the packs of panels will be fed to the line of lifting platforms spaced apart as necessary to stop the packs of panels selectively on the lifting platform selected at each particular operation; the arrangement being such that when the rear side of the pack being handled is detected by said sensor and, if permitted by the operative program of the plant, the first group of rollers (14) is raised and reactivated if it had been previously stopped, and that after discharging all the packs that have reached said abutment bar, in proper time relationship with the lifting up of the transport belts of the transport runway (1), the assembly of the transfer rollers and abutment bar is returned automatically to its original position, with a movement opposite to the advancing movement of the packs on said transport runway.

3. A plant according to claim 2, wherein the operating cycle of the rollers (14-28-33) for transferring the panels towards the line of lifting platforms is such that when the front side of the pack (P) is detected by the sensor (48) arranged between the rollers of the second group of powered rollers (28), the first group of rollers (14) is softly stopped by the respective motion unit comprising said torque-limiter (27) with no need for lowering said first group of rollers, the arrangement being such that these rollers (14) or a part of the rollers in proximity of the second group of powered rollers (28) is connected to its motion unit (26) through the intermediary of at least one free-trip coupling, so that said rollers, still engaged by a pack being transferred, have idle rotation to avoid hindering said pack.

4. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the pack or packs of panels from the dividing machine and feeding said packs, in single file and suitably spaced apart, to transport means operating longitudinally and above the row of lifting platforms, receiving the spaced packs of panels in single file from said transversely operating means, and effecting sorting, soft stacking and orderly arrangement of said packs on the lifting platforms, so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size; means for softly depositing each assembly of stacks, optionally, onto a pallet (R), or directly onto discharging means operating at the lower portion of the same station (E) whereon said assembly is formed;

means (H-G) for feeding automatically to the stations (E) the optional pallets for the assemblies of stacks; and means (G) for moving the assemblies of stacks to a downstream collecting or processing station;

wherein the transport means operating longitudinally above the line of lifting platforms and receiving the packs of panels coming in single file from a transferring clamp, comprises a roller-clamp in line with a preceding roller clamp and which comprises idle, grooved, spring-loaded upper rollers (50) mounted on a common presser (49) adapted to be raised and lowered to conform with the level of the presser (35) of a preceding operative unit, and lower rollers (51) powered at the same speed and in the same direction as rollers (28) of a preceding station and being rotatably supported in cantilever fashion by a rocking structure (52) controlled by cylinder-and-piston units (55), one said rocking structure being provided at each lifting platform (91), similar and respective rocking structures (62) being provided opposite said rocking structures (52) and parallelly thereto and carrying in cantilever fashion idle rollers (61) adapted to support the pack of panels on the side opposite to that which is clamped by the roller-clamps for transferring the packs along the line of lifting platforms, said rocking structures being supported by a powered carriage (64) slidable on stationary guides (66) normal to the longitudinal axis of the transport runway and being controlled by devices which are actuated by a programmer of the plant so that the width of said transport runway will be adapted each time automatically to the width of the packs to be handled (P); the rocking structures carrying the idle rollers (61) being controlled by fluid-operated cylinder-and-piston units (65) whereby, when a pack has been stopped above the selected lifting platform (91), the powered rollers or the idle rollers may be moved laterally away from said pack which will be supported by the teeth (69-69') of comb-like structures (70-70') which are parallelly swingably mounted on the same parts supporting the rocking structures of said rollers (51-61); said comb-like structures (70-70') being controlled by centrally-controlled mechanisms enabling the synchronous actuation thereof, such that, successively to the operations mentioned above, said comb-like structures are also moved away laterally from the pack of panels which will softly come to rest by gravity on the loading plane (91') of the underlying lifting platform which in the next step will be lowered by the same extent as the thickness of the pack deposited thereon, whereafter said rocking structures (52-62-70-70') will all be returned to their active position to repeat a new operative cycle.

5. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located; means operating transversely on an end portion of said transport runway, in line with the row of lifting platforms, and stopping the pack or packs of panels from the dividing machine and feeding said packs, in single file and suitably spaced apart, to transport means operating longitudinally and above the row of lifting platforms, receiving the spaced packs of panels in single file from said transversely operating means, and effecting sorting, soft stacking and orderly arrangement of said packs on the lifting platforms, so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size; means for softly depositing each assembly of stacks, optionally, onto a pallet (R), or directly onto discharging means operating at the lower portion of the same station (E) whereon said assembly is formed;

means (H-G) for feeding automatically to the stations (E) the optional pallets for the assemblies of stacks; and means (G) for moving the assemblies of stacks to a downstream collecting or processing station;

wherein means for actuating synchronous comb-like structures (70-70') supporting through their teeth (69-69') the packs of panels while being transferred onto the respective lifting platforms (91) comprises rods (74-74') connected at one end to rocking structures and at the opposite end to a shaft (76) provided with telescopic members (78) and rotatably supported by fixed parts (54) and movable parts (64) carrying said rocking structures, said shaft being operatively connected to one or more fluid-operated double-acting cylinder-and-piston units (81-81') which will transmit the required synchronous movement to said rocking comb-like structures.

6. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the pack or packs of panels from the dividing machine and feeding said packs, in single file and suitably spaced apart, to transport means operating longitudinally and above the row of lifting platforms, receiving the spaced packs of panels in single file from said transversely operating means, and effecting sorting, soft stacking and orderly arrangement of said packs on the lifting platforms, so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size;

means for softly depositing each assembly of stacks, optionally, onto a pallet (R), or directly onto discharging means operating at the lower portion of the same station (E) whereon said assembly is formed;

means (H-G) for feeding automatically to the stations (E) the optional pallets for the assemblies of stacks; and (G) for moving the assemblies of stacks to a downstream collecting or processing station;

wherein there is provided a carriage (64) carrying rocking structures (62) with idle rollers (61) having pivoted thereto, parallelly to each of said structures, a comb-like structure (84) having teeth which are provided at the ends with vertical aligned small plates (284), which are usually in a retracted position to avoid interfering with the packs of panels being fed to the lifting platforms, said comb-like structures being controlled by respective fluid-operated double-acting cylinder-and-piston units (85), which, when a pack has been unloaded onto a respective lifting platform, are activated, whereby said vertical aligned small plates (284) of said rocking structures are caused to push the top of the stack on a side thereof to force the opposite side thereof to come in line against a stationary, grid-like vertical structure (68) which has a height such as to perform its guiding function even when the packs of panels are moved along the transport runway operative above the lifting platforms, while said packs are controlled at the opposite side by a grid-like guide structure (67) which is formed by plates secured to the rocking structures (62) carrying said idle rollers (61).

7. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the pack or packs of panels from the dividing machine and feeding said packs, in single file and suitably spaced apart, to transport means operating longitudinally and above the row of lifting platforms, receiving the spaced packs of panels in single file from said transversely operating means, and effecting sorting, soft stacking and orderly arrangement of said packs on the lifting platforms, so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size;

means for softly depositing each assembly of stacks, optionally, onto a pallet (R), or directly onto discharging means operating at the lower portion of the same station (E) whereon said assembly is formed;

means (H-G) for feeding automatically to the stations (E) the optional pallets for the assemblies of stacks; and means (G) for moving the assemblies of stacks to a downstream collecting or processing station;

wherein the means for stopping each pack of panels properly above the selected one of the lifting platforms (91) whereon the packs are stacked, comprises sensors (89-90) which detect the front side of the pack and which firstly slow down and then stop a powered group of rollers (51) associated with the selected lifting platform, and which comprise retractable abutments (86) connected to means for vertical and selective handling, guiding means (87) of said abutments being at an angle to the vertical, whereby when said abutments are lowered, after stopping a pack, they also have a horizontal movement away from said pack so that the latter will not be put out of order at all; the active surface of said abutment, designed to engage the pack of panels, being exactly vertical when said abutment is in the upper operative condition.

8. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the pack or packs of panels from the dividing machine and feeding said packs, in single file and suitably spaced apart, to transport means operating longitudinally and above the row of lifting platforms receiving the spaced packs of panels in single file from said transversely operating means, and effecting sorting, soft stacking and orderly arrangement of said packs on the lifting platforms, so that panels of the same size are discharged onto each platform at each particular operation of the transversely operating means;

means transferring the stacks (P') of panels from said lifting platform to adjacent stations (E) where said stacks are arranged in sequence or side by side so as to form parallelepiped assemblies of a predetermined size; means for softly depositing each assembly of stacks, optionally onto a pallet (R), or directly onto discharging means operating at the lower portion of the same station (E) whereon said assembly is formed;

means (H-G) for feeding automatically to the stations (E) the optional pallets for the assemblies of stacks; and means (G) for moving the assemblies of stacks to a downstream collecting or processing station;

wherein said lifting platforms (91) have a comb-like loading plane (91') supported in a cantilever fashion by a carriage structure (96) which is moved vertically by driving and guiding means (96 to 107), the arrangement being such that when a platform is to be cleared of the stack of panels built up thereon, the loading plane of said platform is lowered to a pre-set stop device so as to insert its teeth through the longitudinal void spaces of a frame (108) which is usually in a horizontal position and is provided with a plurality of small idle and co-planar wheels (110) which take over in supporting said stack; said frame (108) being disposed with its longitudinal axis parallel to the axis of said transport runway (1); said plant comprising a carriage (118-119) longitudinally reciprocatable below said frame (108) by the action of guiding and driving means (120 to 125) and provided with a comb-like pusher (117) which may be moved through the longitudinal void spaces of said frame and which, on command, pushes the stack to be discharged to an adjacent co-planar station, whereafter said pusher is returned to its rest position to repeat a new operative cycle; a sliding plane formed by the idle wheels (110) being connected, at the end proximate to the adjacent station to which said stack is to be transferred, to handling means (116), while the other end of said sliding plane is pivoted horizontally (113) to a stationary supporting structure (112), the arrangement being such that, if desired, said sliding plane may be moved from the horizontal position to a longitudinally-inclined position, such that means (126) of the adjacent operative station (E) may be transferred temporarily above said frame (108).

9. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the pack or packs of panels from the dividing machine and feeding said packs, in single file and suitably spaced apart, to transport means operating longitudinally and above the row of lifting platforms, receiving the spaced packs of panels in single file from said transversely operating means and effecting sorting, soft stacking and orderly arrangement of said packs on the lifting platforms so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size; means for softly depositing each assembly of stacks; optionally, onto a pallet (R), or directly onto discharging means operating at the lower portion of the same station (E) whereon said assembly is formed;

means (H-G) for feeding automatically to the stations (E) the optional pallets for the assemblies of stacks; and means (G) for moving the assemblies of stacks to a downstream collecting or processing station;

wherein the stacks (P') of panels discharged from an idle-roller sliding plane (110), located below each lifting platform (91), are transferred onto at least one horizontal table (126) the upper face of which is coated with material which facilitates sliding movement of the stack and avoids marring said stack, said table being secured at two parallel sides to respective carriages (127-128) connected to suitable drive means (130-136) and longitudinally slidable within guides (129) which are parallel to the longitudinal axis of said idle-roller sliding plane and are located partly laterally to said plane, on a stationary supporting structure (120), the arrangement being such that by means of a plurality of strokes of a pusher (117) operating below each lifting platform (91), is sequentially arranged on said table a plurality of stacks.

10. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the pack or packs of panels from the dividing machine and feeding said packs, in single file and suitably spaced apart, to transport means operating longitudinally and above the row of lifting platforms, receiving the spaced packs of panels in single file from said transversely operating means, and effecting sorting, soft stacking and orderly arrangement of said packs on the lifting platforms, so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size;

means for softly depositing each assembly of stacks, optionally, onto a pallet (R), or directly onto discharging means operating at the lower portion of the same station (E) whereon said assembly is formed;

means (H-G) for feeding automatically to the stations (E) the optional pallets for the assemblies of stacks;

means (G) for moving the assemblies of stacks to a downstream collecting or processing station; and at least one steel table (126) is provided with a pusher (137) which when at rest is located at one side of said at least one table, parallelly to a carriage of said at least one table, and which pusher is connected to its own guide and drive means (143 and 149) which, on command, move said pusher horizontally and transversely to the direction of stacks reaching said at least one table so that said stacks will be arranged on said at least one table either in sequence or side by side so as to form a parallelepiped assembly of predetermined dimensions, sensors (138-139-140) being provided to detect the position of rows of stacks being moved transversely on said at least one table and to cause said pusher to return to its rest position.

11. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the pack or packs of panels from the dividing machine and feeding said packs, in single file and suitably spaced apart, to transport means operating longitudinally and above the row of lifting platforms, receiving the spaced packs of panels in single file from said transversely operating means, and effecting sorting, soft stacking and orderly arrangement of said packs on the lifting platforms, so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size;

means for softly depositing each assembly of stacks, optionally, onto a pallet (R), or directly onto discharging means operating at the lower portion of the same station (E) whereon said assembly is formed;

means (H-G) for feeding automatically to the stations (E) the optional pallets for the assemblies of stacks; and means (G) for moving the assemblies of stacks to a downstream collecting or processing station;

wherein at and above the side of at least one table (126) facing a station (D) from which said stacks are coming, there is arranged, parallel to said side, a carriage bar (151) adapted to be lifted and lowered with a guillotine-like movement on said at least one table by the action of lifting and lowering means (152 to 159), so that when said bar is lowered and said at least one table is withdrawn from a build-up station and moved toward a stack-feeding station (D), where a frame (108) has been suitably lowered, the assembly of stacks (P') is retained at said build-up station and softly comes to rest on an underlying supporting structure for subsequent transfer.

12. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the pack or packs of panels from the dividing machine and feeding said packs, in single file and suitably spaced apart, to transport means operating longitudinally and above the row of lifting platforms, receiving the spaced packs of panels in single file from said transversely operating means and effecting sorting, soft stacking and orderly arrangement of said packs on the lifting platforms, so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size;

means for softly depositing each assembly of stacks, optionally onto a pallet (R), or directly onto discharging means operating at the lower portion of the same station (E) whereon said assembly is formed;

means (H-G) for feeding automatically to the stations (E) the optional pallets for the assemblies of stacks; and means (G) for moving the assemblies of stacks to a downstream collecting or processing station;

wherein guides (154) controlling the up-and-down movement of a carriage bar (151) are at an angle at the lower portion thereof whereby, when said carriage bar is raised after the assembly of stacks (P') has been discharged from at least one table (126), said bar will be moved away from said assembly with a horizontal component of displacement, thereby avoiding interfering with said assembly.

13. A plant for stacking automatically on respective lifting platforms packs of panels of different sizes coming from a dividing machine and for orderly arranging said stacks adjacent to each other, to form parallelepiped assemblies for transfer to a discharge station, said plant comprising a transport runway whereon the packs of panels coming from the dividing machine are arranged and moved side by side or in sequence;

at least one row of lifting platforms located laterally and perpendicularly to said transport runway, a top side of said platforms being below an imaginary horizontal plane in which said transport runway is located;

means operating transversely on an end portion of said transport runway, in line with the row of lifting platforms, and stopping the pack or packs of panels from the dividing machine and feeding said packs in single file and suitably spaced apart, to transport means operating longitudinally and above the row of lifting platforms, receiving the spaced packs of panels in single file from said transversely operating means and effecting sorting, soft stacking and orderly arrangement of said packs on the lifting platforms, so that panels of the same size are discharged onto each platform at each particular operation of the transversely operating means;

means transferring the stacks (P') of panels from said lifting platforms to adjacent stations (E) where said stacks are arranged in sequence or side by side so as to form parallelepiped assemblies of a predetermined size; means for softly depositing each assembly of stacks, optionally, onto a pallet (R), or directly onto discharging means operating at the lower portion of the same station (E) whereon said assembly is formed;

means (H-G) for feeding automatically to the stations (E) the optional pallets for the assemblies of stacks; and means (G) for moving the assemblies of stacks to a downstream collecting or processing station;

wherein at said station (E) where the stacks are built up there is provided below at least one table (126) a horizontal bed (165) with parallel and co-planar powered belts (163) oriented in the same direction as the feeding direction of the stacks of panels toward said at least one table (126), said bed being mounted on a main frame (162) adapted to be lifted and lowered by guiding and driving means (169 and 172); wherein mounted on said frame through the intermediary of guiding and lifting and lowering means (175–177) is a further bed (176) provided with rows of idle and co-planar small rollers (179) which, depending upon the position of said bed, may either emerge or be located below the transport plane formed by said belts, said rows of rollers being located in hollow longitudinal spaces between said belts (163), further wherein means are provided whereby said station may operate as follows: the main frame (162) with its belts is in a lower position thereof and the bed with the idle rollers (176) is also in a lower position thereof; the belts (163) are activated to insert below said at least one table a pallet (R) to be moved against a stationary front abutment (180); the main frame (162) is lifted and this lifting movement is stopped automatically by sensors when the pallet is in substantial engagement with a lower face of said at least one table (126) where the stacks are built up, the arrangement being such that when the assembly of stacks has been transferred onto said pallet, after withdrawal of said at least one table (126), the main frame (162) is lowered to cycle-start position and the belts (163) are activated to discharge the combination pallet assembly of stacks and to be reset for a new operating cycle.

14. A plant according to claim 13, wherein the means located below said at least one table (126), in case the assembly of stacks is to be discharged without being deposited onto a pallet, operate as follows: the idle-roller bed (176) is lifted so that said rollers emerge from the belts (163); the main frame (162) is lifted by a fixed stroke so as to bring said rollers (179) in contact with a lower surface of said at least one table thereabove (126); after discharge of the assembly of stacks onto the idle-roller bed (176), said bed is lowered whereby said assembly is placed onto the underlying belts (163); the main frame (162) is lowered to cycle-start position and the belts (163) are powered to discharge the assembly of stacks and to re-set the components for a new operating cycle.

15. A plant for stacking automatically on respective lifting platforms packs of panels of different sizes coming from a dividing machine and for orderly arranging said stacks adjacent to each other, to form parallelepiped assemblies for transfer to a discharge station, said plant comprising

- a transport runway whereon the packs of panels coming from the dividing machine are arranged and moved side by side or in sequence;
- at least one row of lifting platforms located laterally and perpendicularly to said transport runway, a top side of said platforms being below an imaginary horizontal plane in which said transport runway is located;
- means operating transversely on an end portion of said transport runway, in line with the row of lifting platforms, and stopping the pack or packs of panels from the dividing machine and feeding said packs, in single file and suitably spaced apart, to transport means operating longitudinally and above the row of lifting platforms, receiving the spaced packs of panels in single file from said transversely operating means and effecting sorting, soft stacking and orderly arrangement of said packs on the lifting platforms, so that panels of the same size are discharged onto each platform at each particular operation of the transversely operating means;
- means transferring the stacks (P') of panels from said lifting platforms to adjacent stations (E) where said stacks are arranged in sequence or side by side so as to form parallelepiped assemblies of a predetermined size;
- means for softly depositing each assembly of stacks, optionally, onto a pallet (R), or directly onto discharging means operating at the lower portion of the same station (E) whereon said assembly is formed;
- means (H-G) for feeding automatically to the stations (E) the optional pallets for the assemblies of stacks; and
- means (G) for moving the assemblies of stacks to a downstream collecting or processing station; wherein means for stopping the lifting movement of a main frame (162) located below at least one table (126) where the stacks are built up, comprises a feeler (182) mounted on means (183-184) for positioning said feeler, on command, at a point of maximum camber of said at least one table (126) to detect when the pallet engages said at least one table and causes the pallet to become planar, whereafter said sensor (182) is moved away to leave said at least one table unhindered.

* * * * *